(12) United States Patent
Yokoyama et al.

(10) Patent No.: US 12,174,576 B2
(45) Date of Patent: Dec. 24, 2024

(54) CLEANING MEMBER AND ELASTIC MEMBER

(71) Applicant: CANON KABUSHIKI KAISHA, Tokyo (JP)

(72) Inventors: Masanori Yokoyama, Shizuoka (JP); Kenya Terada, Shizuoka (JP); Takehiko Aoyama, Shizuoka (JP); Shota Segawa, Shizuoka (JP); Hisao Kato, Kanagawa (JP); Mitsuhiro Kunieda, Kanagawa (JP); Arihiro Yamamoto, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/519,423

(22) Filed: Nov. 27, 2023

(65) Prior Publication Data

US 2024/0111241 A1    Apr. 4, 2024

Related U.S. Application Data

(63) Continuation of application No. PCT/JP2022/021388, filed on May 25, 2022.

(30) Foreign Application Priority Data

Jun. 4, 2021  (JP) ................... 2021-094304
May 12, 2022  (JP) ................... 2022-079036

(51) Int. Cl.
*G03G 21/00*    (2006.01)
*B60S 1/04*     (2006.01)
(Continued)

(52) U.S. Cl.
CPC ........ *G03G 21/0029* (2013.01); *B60S 1/0419* (2013.01); *G03G 15/0225* (2013.01); (Continued)

(58) Field of Classification Search
CPC .......... G03G 15/0225; G03G 15/0258; G03G 15/161; G03G 15/166; G03G 15/168;
(Continued)

(56) References Cited

U.S. PATENT DOCUMENTS 9,037,069 B2    5/2015  Watabe et al.
9,632,474 B2    4/2017  Yamamoto et al.
(Continued)

FOREIGN PATENT DOCUMENTS

JP    2004-51894 A    2/2004
JP    2008-209736 A   9/2008
(Continued)

OTHER PUBLICATIONS

International Search Report in International Application No. PCT/JP2022/021388 (Aug. 2022).

*Primary Examiner* — Joseph S Wong
(74) *Attorney, Agent, or Firm* — Venable LLP

(57) ABSTRACT

Provided is a cleaning member, comprising an elastic member that includes polyurethane, wherein: when tan δ of a test piece sampled from the elastic member is measured in the temperature range of −20° C. to +60° C., the peak temperature of a peak indicating the maximum value of tan δ is at 15.0° C. or below; the maximum value of tan δ is 0.20 to 0.55; tan δ at a temperature of 55° C. is 0.13 or larger; and where the detected quantity of all ions obtained when the test piece is heated at a rate of temperature increase of 10° C./second to 1000° C. using a direct-sampling mass spectrometer is M1 and the integrated intensity of a peak in a derived ion thermogram that corresponds to a range of m/z values originating in multifunctional isocyanate with at least three isocyanate groups is M2, M2/M1 is at least 0.001.

18 Claims, 5 Drawing Sheets

(51) Int. Cl.
*B60S 1/38* (2006.01)
*G03G 15/02* (2006.01)
*G03G 15/16* (2006.01)
*G03G 15/20* (2006.01)
*G03G 21/16* (2006.01)

(52) U.S. Cl.
CPC ....... *G03G 15/0258* (2013.01); *G03G 15/161* (2013.01); *G03G 15/166* (2013.01); *G03G 15/168* (2013.01); *G03G 15/2025* (2013.01); *G03G 21/0011* (2013.01); *G03G 21/0017* (2013.01); *G03G 21/0058* (2013.01); *G03G 21/007* (2013.01); *G03G 21/169* (2013.01); *B60S 2001/3836* (2013.01); *G03G 2215/0805* (2013.01); *G03G 2215/0897* (2013.01); *G03G 2215/1647* (2013.01); *G03G 2215/1652* (2013.01); *G03G 2215/1657* (2013.01); *G03G 2215/1661* (2013.01); *G03G 2221/0068* (2013.01)

(58) Field of Classification Search
CPC ........... G03G 15/2025; G03G 21/0011; G03G 21/0017; G03G 21/0029; G03G 21/0058; G03G 21/007; G03G 21/169; G03G 2215/0805; G03G 2215/0897; G03G 2215/1647; G03G 2215/1652; G03G 2215/1657; G03G 2215/1661; G03G 2221/0068; B60S 1/0419; B60S 2001/3836
See application file for complete search history.

(56) References Cited

U.S. PATENT DOCUMENTS

| | | | |
|---|---|---|---|
| 9,996,047 | B2 | 6/2018 | Kawakami et al. |
| 10,088,795 | B2 | 10/2018 | Ikeda et al. |
| 11,312,815 | B2 | 4/2022 | Hasegawa et al. |
| 11,630,411 | B2 | 4/2023 | Yamamoto et al. |
| 2008/0249277 | A1 | 10/2008 | Sanjo et al. |
| 2012/0115998 | A1 | 5/2012 | Schumann et al. |
| 2016/0259293 | A1* | 9/2016 | Shimizu ............. G03G 21/0017 |
| 2018/0004150 | A1* | 1/2018 | Fukuda .............. G03G 9/08797 |
| 2018/0120754 | A1* | 5/2018 | Takeuchi ........... G03G 21/0011 |
| 2023/0147463 | A1 | 5/2023 | Lange et al. |
| 2023/0157492 | A1 | 5/2023 | Segawa et al. |
| 2023/0157493 | A1 | 5/2023 | Aoyama et al. |
| 2023/0259062 | A1 | 8/2023 | Matsuda et al. |

FOREIGN PATENT DOCUMENTS

| | | |
|---|---|---|
| JP | 2012-48111 A | 3/2012 |
| JP | 2014-232311 A | 12/2014 |
| JP | 2019-115471 A | 7/2019 |
| WO | 2017/056903 A1 | 4/2017 |
| WO | 2018/207807 A1 | 11/2018 |
| WO | 2021/011212 A1 | 1/2021 |
| WO | 2022/002524 A1 | 1/2022 |
| WO | 2022/002526 A1 | 1/2022 |
| WO | 2022/002527 A1 | 1/2022 |
| WO | 2022/255184 A1 | 12/2022 |

* cited by examiner

CLEANING MEMBER AND ELASTIC MEMBER

CROSS-REFERENCE TO RELATED APPLICATION

This is a continuation of International Application No. PCT/JP2022/021388, filed on May 25, 2022, and designated the U.S., and claims priority from Japanese Patent Application No. 2021-094304 filed on Jun. 4, 2021, and Japanese Patent Application No. 2022-079036 filed on May 12, 2022, the entire contents of which is incorporated herein by reference.

BACKGROUND OF THE INVENTION

Field of the Invention

The present disclosure relates to a cleaning member such as an electrophotographic cleaning blade, a wiper for vehicles such as automobiles, and a wiper for wiping window glass and walls, and relates to an elastic member that is used in such a cleaning member.

Background Art

Elastic bodies worked to have shapes that are superior in terms of cleaning are used as cleaning members for removing dirt and the like from smooth surfaces such as glass. Among these there is often used polyurethane, which exhibits excellent elastic performance and wear resistance. Such cleaning members are used in electronic equipment such as electrophotographic devices, windows of, for instance, vehicles, aircraft and vessels, glass windows of buildings and houses, bathroom walls, and solar panels and the like. PTL1 discloses a polyurethane elastomer for cleaning blades of electronic copying machines. PTL 2 discloses, as a vehicle wiper, a cleaning member that utilizes polyurethane, and PTL 3 discloses, as a window cleaning member, a cleaning member that utilizes polyurethane.

CITATION LIST

Patent Literature

[PTL 1] Japanese Patent Application Publication No. 2008-209736
[PTL 2] Japanese Patent Application Publication No. 2004-051894
[PTL 3] Japanese Patent Application Publication No. 2019-115471

SUMMARY OF THE INVENTION

It has been observed that the wiping performance of the cleaning members in the above citations decreases as the temperature of the cleaning members rises accompanying the use of the same in a high-temperature environment or for a prolonged period of time. The object of the invention according to PTL 1 is to provide a polyurethane elastomer for use in cleaning blades of electronic copying machines, in which the polyurethane elastomer exhibits excellent low-temperature characteristics, namely a glass transition point of −5° C. or lower, while exhibiting small changes in viscoelasticity in a wide range of ambient temperature. To attain such an object, the above problem can be solved by a polyurethane elastomer that is made up of a polyol component, a chain extender and an isocyanate component, wherein the polyol component includes a bifunctional silicone oil having hydroxyl groups at both ends, and having also an ester group in molecules; the isocyanate component includes an aromatic isocyanate; the content of silicone oil is 5.0 to 50 wt % relative to the polyurethane elastomer; the polyurethane elastomer exhibits a shore A hardness of 70 to 90, a viscoelasticity value tan δ (10) at 10° C. of 0.32 or less, and a viscoelasticity value tan δ (55) at 55° C. of 0.02 or more; and a difference between tan δ (10) and tan δ (55) no greater than 0.30. However the polyurethane elastomers produced in examples exhibit large discrepancies between a peak value of tan δ and a tan δ value at a temperature of 55° C. In particular, the value of tan δ at a temperature of 55° C. is excessively small in terms of stabilizing wiping performance at that temperature.

One aspect of the present disclosure aims at providing a cleaning member that allows preventing impairment of wiping performance, when heated up by being used in high-temperature environments or by being used over along period of time. A further aspect of the present disclosure aims at providing an elastic member having a loss factor tan δ that is not prone to dropping even under high temperatures.

According to at least one aspect of the present disclosure, there is provided a cleaning member comprising an elastic member comprising a polyurethane, and the cleaning member cleans a surface of a to-be-cleaned member through contact of at least a part of the elastic member against the surface of the to-be-cleaned member, wherein in measurement with a temperature range of −20° C. to +60° C. of a loss factor tan δ of a sample sampled from the elastic member so as to include a portion of contact with the to-be-cleaned member, a peak temperature of a peak denoting a maximum value of tan δ is present at 15.0° C. or below, and a maximum value of tan δ is from 0.20 to 0.55, and tan δ at a temperature of 55° C. is 0.13 or larger, wherein, when the sample sampled from the elastic member so as to include the portion of contact with the to-be-cleaned member is heated and vaporized within an ionization chamber and heated up to 1000° C. at a ramp rate of 10° C./second by using a mass spectrometer of direct sample introduction type which ionizes the molecules constituting the sample, with M1 denoting a detected amount of all ions obtained, and M2 denoting a peak integrated intensity in an extracted ion thermogram corresponding to a range of an m/z value derived from a polyfunctional isocyanate having three or more isocyanate groups, M2/M1 is 0.001 or higher.

According to at least one aspect of the present disclosure, there is provided an elastic member comprising a polyurethane, wherein when a loss factor tan δ of a sample sampled from the elastic member is measured in a temperature range of −20° C. to +60° C., a peak temperature of a peak denoting a maximum value of tan δ is present at 15.0° C. or below, and a maximum value of tan δ is from 0.20 to 0.55;

tan δ at a temperature of 55° C. is 0.13 or larger; wherein, when the sample sampled from the elastic member is heated and vaporized within an ionization chamber and heated up to 1000° C. at a ramp rate of 10° C./second by using a mass spectrometer of direct sample introduction type which ionizes the molecules constituting the sample, and with M1 denoting a detected amount of all ions obtained, and M2 denoting a peak integrated intensity in an extracted ion thermogram corresponding to a range of an m/z value derived from a polyfunctional isocyanate having three or more isocyanate groups, M2/M1 is 0.001 or higher.

Further features of the present disclosure will become apparent from the following description of exemplary embodiments with reference to the attached drawings.

DESCRIPTION OF THE EMBODIMENTS

Figure 1:
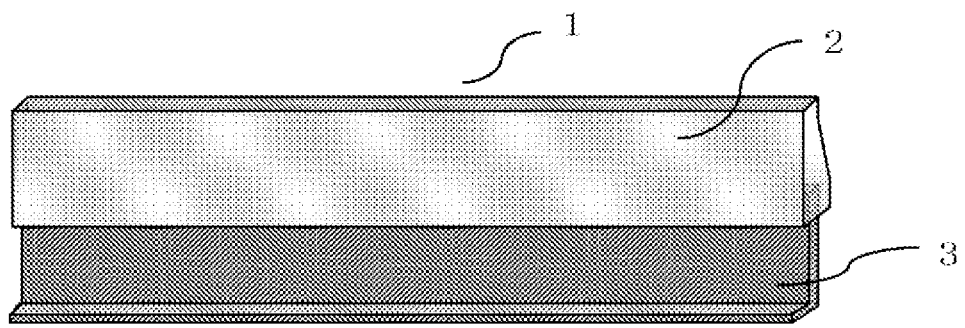
FIG. 1 is a schematic perspective-view diagram of an electrophotographic cleaning blade.

In the present disclosure, the description "from XX to YY" or "XX to YY" indicative of the numerical value range means the numerical value range including the lower limit and the upper limit of the endpoints unless otherwise specified.

When the numerical value range is described in stages, the upper limit and the lower limit of each numerical value range can be combined arbitrarily.

The inventors found that for instance an elastic member according to the aspect described below, and a cleaning member that utilizes the elastic member, boast excellent followability towards a to-be-cleaned member, and allow preventing impairment of wiping performance, when the members heat up by being used in high-temperature environments or by being used over long periods of time.

<Configuration of the Cleaning Member>
<Peak Temperature of Loss Coefficient (tan δ)>

A cleaning member provided with an elastic member has a peak top temperature (hereafter also referred to as "tan δ peak temperature") of a peak exhibiting a maximum value of tan δ of 15.0° C. or lower, in a measurement of a loss factor (hereafter also referred to as "tan δ") within a temperature range of −20° C. to +60° C., of a sample having been sampled, from the elastic member, so as to include the contact region with the to-be-cleaned member. The tan δ peak temperature is an index generally referred to as glass transition temperature. With the tan δ peak temperature as a boundary, the resin-like properties the elastic body become strong a temperatures lower than the tan δ peak temperature, whereas at higher temperatures the elastic body behaves as an elastic body. If the tan δ peak temperature is 15.0° C. or lower, the elastic member can be caused to function as an elastic body in an actual operating temperature range (for instance, 0 to 55° C.) of the cleaning member.

The tan δ peak temperature is preferably 14.0° C. or lower, more preferably 13.0° C. or lower. The lower limit is not particularly restricted, but is preferably −5.0° C. or higher, more preferably 0.0° C. or higher, and yet more preferably 5.0° C. or higher. The tan δ peak temperature can be adjusted on the basis of the ratio of hard and soft segments relative to the polyurethane. Specifically, the tan peak temperature can be controlled to be lower by increasing a ratio of soft segments to hard segments. A concrete method to that end may for instance involve increasing the ratio of polyol to isocyanate in a starting material composition of the polyurethane.

<Maximum Value (Peak Value) of the Loss Coefficient (tan δ)>

Herein tan δ represents the ratio of a viscosity component with respect to an elastic component, of the elastic member. The lower this value is, the higher becomes the proportion of the elastic component denoted thereby, and the faster becomes the response towards forces exerted on the elastic member. In order to obtain an elastic member exhibiting good followability towards the to-be-cleaned member, it is therefore effective to lower the maximum value of tan δ (hereafter also referred to as "tan δ peak value").

Specifically, the elastic member can exhibit good followability towards the to-be-cleaned member by prescribing the tan δ peak value of the elastic member to be from 0.20 to 0.55. The tan δ peak value is particularly preferably from 0.25 to 0.50.

<Loss Coefficient (tan δ) at a Temperature of 55° C.>

In terms of energy, tan δ represents lost energy relative to stored energy. When tan δ is high, the rate of conversion of inputted vibrational energy into lost energy such as heat is high, and accordingly the elastic member can exhibit high vibration damping properties.

In a case where a cleaning member provided with an elastic member made up of polyurethane rubs against the to-be-cleaned member for a long time, the temperature of the elastic member may rise to for instance about 55° C. on account of the resulting frictional heat. As the temperature of the elastic member rises, tan δ drops and followability towards the to-be-cleaned member improves but, conversely, vibration damping properties worsen. As a result, vibration and abnormal noise may occur, and uneven wiping and wiping streaks may likewise occur. Therefore, in order to bring out stable wiping performance even when the temperature of the elastic member reaches 55° C., it is effective herein to prescribe that tan δ at a temperature of 55° C. is to be 0.13 or larger. Herein tan δ at a temperature of 55° C. is particularly preferably 0.15 or larger. The upper limit is not particularly restricted so long as it is smaller than the above tan δ peak value, but preferably the upper limit is for instance 0.50 or smaller, and particularly 0.35 or smaller.

One method for lowering the tan δ peak value may involve conferring a crystal bridge structure to the elastic member. However, when simply developing a crystalline structure in the elastic member, the value of the viscosity term decreases as the mobility of the molecules that make up the resin increases, at a high temperature such as 55° C. As a result, tan δ decreases, the vibration damping performance of the elastic member worsen, and vibration is prone to occur. It was therefore found that a polyurethane is effective herein such that the tan δ peak value of the elastic member is prescribed not higher than 0.55 and tan δ at a temperature of 55° C. is not too small, with a view to obtaining a cleaning member boasting high followability towards the to-be-cleaned member and that is not prone to develop vibration even at high temperatures.

Therefore, studies by the inventors revealed that, by using a bifunctional diphenylmethane diisocyanate and a trifunctional or higher polyfunctional isocyanate (for instance polymeric MDI) at a predetermined ratio as starting materials of the polyurethane, and by using a specific catalyst that allows causing the polyfunctional isocyanate to react with a polyol with high efficiency, a polyurethane having a tan δ of 0.13 or more at a temperature of 55° C. can be obtained, while exhibiting a tan δ peak temperature of 15.0° C. or lower and a peak value in the range from 0.20 to 0.55. The reasons for a polyurethane exhibiting such physical properties can be obtained by using materials such as those above are inferred as follows.

Firstly, by causing isocyanate groups of a polyfunctional isocyanate to react very efficiently with a polyol, through the use of a specific catalyst, a polyurethane exhibiting a high crosslinking density can be formed. This allows that the elastic term can be made larger. Meanwhile, a urethane bonding portion derived from diphenylmethane diisocyanate exhibits high planarity and is readily amenable to stacking. As a result, a portion in which there is developed a crystalline structure (hereafter also referred to as a "crystalline region") is formed in hard segments. In crystalline region, when an external force is applied, the external force can be absorbed through crystal shifting, which accordingly acts so as to increase the viscosity term. Although in a normal temperature region both the viscosity term and the elastic term exhibit large values, by adjusting the ratio of diphenylmethane diisocyanate and polyfunctional isocyanate, the tan δ peak value can however be controlled so as to lie within a predetermined range.

In addition, usually, in a high temperature region, it is considered that the value of the viscosity term hard segments decreases as a result of loosening or unraveling of crystalline structure accompanying the increased activity of molecular motion. However, it is deemed that in the polyurethane according to the present disclosure, in addition to the crystallinity of the crystalline region derived from diphenylmethane diisocyanate, a three-dimensional crosslinked structure derived from the polyfunctional isocyanate is also developed; as a result, the crystalline structure does not collapse readily even at high temperatures, and the value of the viscosity term can be maintained to certain extent also at high temperatures, such as a temperature of 55° C.

The elastic member in accordance with one of the aspects of the present disclosure is, when the sample sampled from the elastic member so as to include the portion of contact with the to-be-cleaned member is heated and vaporized within an ionization chamber and heated up to 1000° C. at a ramp rate of 10° C./second by using a mass spectrometer of direct sample introduction type which ionizes the molecules constituting the sample, with M1 denoting a detected amount of all ions obtained, and M2 denoting a peak integrated intensity in an extracted ion thermogram corresponding to a range of an m/z value derived from a polyfunctional isocyanate having three or more isocyanate groups, M2/M1 is 0.001 or higher.

A polyurethane such that M2/M1 is 0.001 or higher may have a high-order crosslinked structure derived from the trifunctional or higher isocyanate. Polyurethanes having such a high-order crosslinked structure can more easily achieve such physical properties as exhibiting a tan δ peak temperature of 15.0° C. or lower, a tan δ peak value of 0.20 to 0.55, and a tan δ of 0.13 or higher at a temperature of 55° C. M2/M1 is preferably 0.002 or higher, and more preferably 0.004 or higher. Although the upper limit is not particularly limited, M2/M1 is preferably 0.035 or lower, more preferably 0.020 or lower. Therefore, M2/M1 is preferably from 0.001 to 0.035, particularly preferably from 0.002 to 0.035, and more preferably from 0.004 to 0.020.

In the polyurethane according to the present disclosure, when M3 denotes the integrated intensity of the peak of the extracted ion thermogram corresponding to a range of an m/z value derived from a diisocyanate, obtained from the analysis method using the mass spectrometer of direct sample introduction type, M3/M1 at a first tapered surface and/or second tapered surface is preferably 0.025 to 0.130, and more preferably 0.038 to 0.108. When M3/M1 within the above range, the polyurethane can have a crystalline structure to a certain extent.

Polyurethanes having such a crystalline structure can develop more readily such physical properties as exhibiting a tan δ peak temperature of 15.0° C. or lower, a tan δ peak value of 0.20 to 0.55, and a tan δ of 0.13 or higher at a temperature of 55° C.

Preferably M2/M3 is set to be from 0.046 to 0.441. Herein M2/M3 is a parameter denoting a ratio of the diisocyanate-derived structural portion, and a structural portion derived from the trifunctional or higher polyfunctional isocyanate, in the isocyanate-derived structure of the polyurethane. By prescribing M2/M3 within the above range, it is easier to achieve physical properties such as exhibiting a tan δ peak temperature of 15.0° C. or lower, a tan δ peak value of 0.20 to 0.55, and a tan δ of 0.13 or higher at a temperature of 55° C.

The polyurethane according to one aspect of the present disclosure can be for instance a reaction product of a polyurethane starting material composition that comprises an isocyanate compound including a diisocyanate and a trifunctional or higher polyfunctional isocyanate, and an alcohol including a trifunctional or higher polyfunctional alcohol.

Examples of the above polyol may include the following. Polyester polyols such as polyethylene adipate polyol, polybutylene adipate polyol, polyhexylene adipate polyol, (polyethylene/polypropylene) adipate polyol, (polyethylene/polybutylene) adipate polyol and (polyethylene/polyneopentylene) adipate polyol; polycaprolactone-based polyols obtained through ring-opening polymerization of caprolactone; polyether polyols such as polyethylene glycol, polypropylene glycol and polytetramethylene ether glycol; as well as polycarbonate diol.

The foregoing may be used singly or in combinations of two or more types. Among the above polyols, polyester polyols using the adipate are preferable, since in that case a polyurethane elastomer that exhibits excellent mechanical characteristics can be obtained.

In particular, more preferable is a polyol having 4 or more carbon atoms, such as polybutylene adipate polyol or polyhexylene adipate polyol. Preferably, polyols having dissimilar numbers of glycol carbons, such as polybutylene adipate polyol and polyhexylene adipate polyol, are concomitantly used herein. Soft segment crystallization is suppressed thanks to the presence of different types of polyols; in turn, this allows suppressing hard segment aggregation.

Glycols and polyhydric alcohols capable of extending polyurethane elastomer chains can be used herein as the chain extender.

Examples of glycols include the following. Ethylene glycol (EG), diethylene glycol (DEG), propylene glycol (PG), dipropylene glycol (DPG), 1,4-butane diol (1,4-BD), 1,6-hexane diol (1,6-HD), 1,4-cyclohexane diol, 1,4-cyclohexane dimethanol, and xylylene glycol (terephthalyl alcohol), and triethylene glycol. Examples of trihydric or higher polyhydric alcohols include trimethylolpropane, glycerin, pentaerythritol and sorbitol. The foregoing may be used singly or in combinations of two or more types.

Examples of the above diisocyanate include the following. 4,4'-diphenylmethane diisocyanate (4,4'-MDI), 2,4-tolylene diisocyanate (2,4-TDI), 2,6-tolylene diisocyanate (2,6-TDI), xylene diisocyanate (XDI), 1,5-naphthylene diisocyanate (1,5-NDI), p-phenylene diisocyanate (PPDI), hexamethylene diisocyanate (HDI), isophorone diisocyanate (IPDI), 4,4'-dicyclohexylmethane diisocyanate (hydrogenated MDI), tetramethylxylene diisocyanate (TMXDI) and carbodiimide-modified diphenylmethane diisocyanate.

Preferred among the foregoing is 4,4'-MDI, since the two isocyanate groups thereof have commensurate reactivity.

For instance the trifunctional or higher polyfunctional isocyanate is at least one selected from the group consisting of triphenylmethane-4,4',4"-triisocyanate (TTI), tris(phenylisocyanate)thiophosphate (TPTI) and polymeric MDI. Among the foregoing, tris(phenylisocyanate)thiophosphate (TPTI) and polymeric MDI can be used more suitably.

The polymeric MDI is represented by Chemical formula (1) and Chemical formula (1)' below. The n in the chemical formula (1)' is preferably from 1 to 4. The chemical formula (1) indicates the case where n is 1 in the chemical formula (1)'.

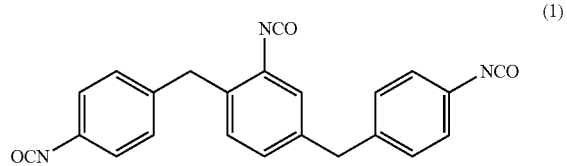

(1)

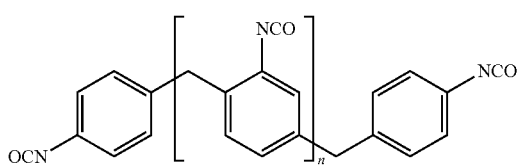

(1)'

In a case where the polyurethane is a polyurethane produced using polymeric MDI represented by Chemical formula (1)', as a trifunctional or higher polyfunctional isocyanate, M2 may be set to the total of peak integrated intensities corresponding to a range where an m/z value derived from n=1 in the structure represented by Chemical formula (1)' is 380.5 to 381.5, a range where an m/z value derived from n=2 is 511.5 to 512.5, a range where an m/z value derived from n=3 is 642.5 to 643.5, and a range where an m/z value derived from n=4 is 773.5 to 774.5, in an extracted ion thermogram obtained by mass spectrometry described above.

Further, TTI as a trifunctional or higher isocyanate has the structure represented by Chemical formula (3) below.

In a polyurethane synthesized using TTI, M2 may be set to the integrated intensity of a peak derived from a cation product of TTI, for which m/z appears in a range of 366.5 to 367.5 in an extracted ion thermogram obtained in accordance with the above method.

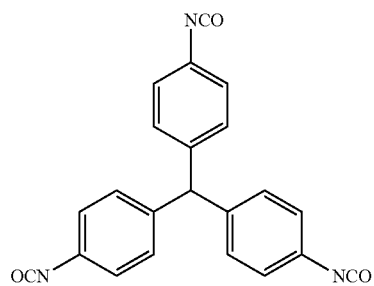

(3)

Tris(phenylisocyanate)thiophosphate (TPTI), as the trifunctional or higher polyfunctional isocyanate, has a structure represented by Chemical formula (4) below. In a polyurethane synthesized using TPTI, M2 may be set to the integrated intensity of a peak derived from a cation product of TPTI, for which m/z appears in a range of 464.5 to 465.5 in an extracted ion thermogram obtained by mass spectrometry described above.

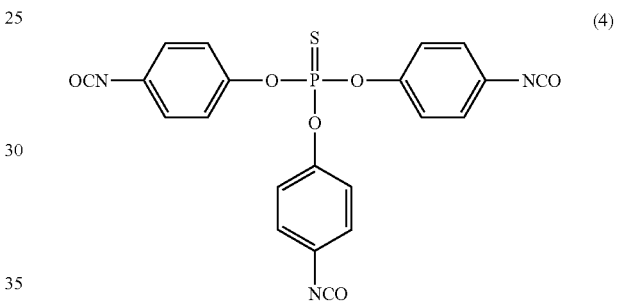

(4)

In a polyurethane synthesized using 4,4'-MDI represented by Chemical formula (2) as a diisocyanate, M3 may be set to the integrated intensity of a peak derived from 4,4'-MDI and such that the m/z value derived from the structure represented by Chemical formula (2) has a peak top at a position of 249.5 to 250.5, in an extracted ion thermogram obtained by mass spectrometry described above.

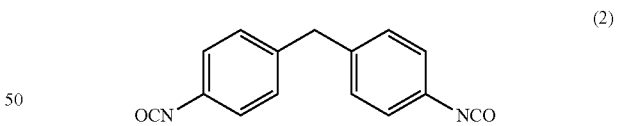

(2)

Ordinarily used catalysts for polyurethane elastomer curing can be used as the catalyst. Tertiary amino alcohols are preferred among the foregoing. Examples of tertiary amino alcohols include 2-(dimethylamino)ethanol, 3-(dimethylamino)propanol, 2-(dimethylamino)-1-methylpropanol, 2-{2-(dimethylamino)ethoxy}ethanol, 2-{2-(diethylamino)ethoxy}ethanol and 2-[{2-(dimethylamino)ethyl}methylamino]ethanol.

Preferred among the foregoing are 2-[{2-(dimethylamino)ethyl}methylamino]ethanol (product name: TOYOCAT-RX5, by Tosoh Corporation) and 2-{2-(dimethylamino)ethoxy}ethanol (product name: TOYOCAT-RX3, by Tosoh Corporation), which are temperature-sensitive catalysts that allow conducting efficiently crosslinking reactions in which trifunctional or higher polyfunctional isocyanates are utilized. Such a temperature-sensitive catalyst allows causing the above polyfunctional isocyanate to react with a polyol, with very high efficiency, and enables yet better formation of a higher-order crosslinked structure in the polyurethane.

The formulation of the starting material composition of the polyurethane may include, as needed, pigments, plasticizers, waterproofing agents, antioxidants, ultraviolet absorbers, light stabilizers and so forth.

<Structure of a Cleaning Member in Electrophotography>

The cleaning member according to one aspect of the present disclosure can be used for instance as a cleaning blade for electrophotographic image forming apparatuses. Examples of the to-be-cleaned member to which an electrophotographic cleaning blade can be applied include image bearing members such as photosensitive members, and endless belts such as intermediate transfer belts. Embodiments of the cleaning member will be explained in detail below on the basis of an example of an image bearing member as the to-be-cleaned member, but the present invention is not limited thereto.

FIG. 1 is a schematic perspective-view diagram of a cleaning member 1. The cleaning member 1 has an elastic member 2 containing a polyurethane according to one aspect of the present disclosure, and a support member 3 that supports the elastic member 2. Preferably, the support member 3 supports the elastic member 2 over the longitudinal direction of the elastic member 2.

Figure 2:
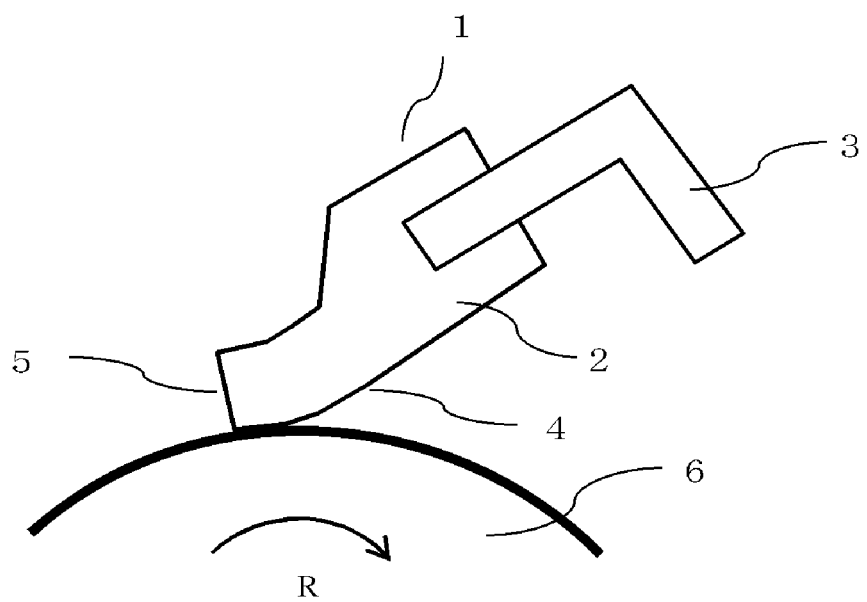
FIG. 2 is a diagram illustrating contact of a cleaning blade with a to-be-cleaned member.

FIG. 2 is an example schematically illustrating a cross-sectional state in which the cleaning member 1 is in contact with a to-be-cleaned member 6. The elastic member 2 has a main surface 4 facing the to-be-cleaned member 6, and a leading end surface 5 that forms a tip side edge, together with the main surface 4. The reference symbol R denotes the rotation direction of the to-be-cleaned member.

During operation of an electrophotographic image forming apparatus, the internal temperature of the apparatus rises to the vicinity of 55° C. This is influenced not only by heat generated at a contact region between the cleaning member and the to-be-cleaned member, but also for instance by a heater in the apparatus. The temperature of the elastic member easily rises to about 55° C. as a result of rubbing with the to-be-cleaned member such as an image bearing member. However, the cleaning blade provided with an elastic member according to the present disclosure allows preserving stable cleaning performance even when the elastic member reaches a high temperature, such as 55° C. In this respect, the electrophotographic cleaning blade according to one aspect of the present disclosure contributes to stable formation of high-quality electrophotographic images.

[Support Member]

As illustrated in FIG. 2, the support member is a member 3 that supports the elastic member 2, within an electrophotographic image forming apparatus, so that the tip of the elastic member 2 comes into contact with the surface of an electrophotographic photosensitive drum 6 as the to-be-cleaned member. The structure of the support member is not particularly limited, so long as the functionality of the member can be brought out. The material of the member is not particularly limited, so long as the functionality thereof can be brought out, and examples include the following materials. For instance metallic materials such as steel sheets, stainless steel sheets, galvanized steel sheets, chromium-free steel sheets, and resin materials such as 6-nylon and 6,6-nylon.

<Method for Producing a Cleaning Blade Provided with an Elastic Member>

The method for producing the cleaning blade according to the present disclosure is not particularly limited, and any suitable method may be selected from among known methods. For instance a release agent may be applied onto the inner surface of a mold for a cleaning blade, and a support member may be placed on the mold, followed by injection of the above polyurethane starting material composition, and curing through heating, so that a cleaning blade can be obtained as a result in which a plate-like elastic member (blade member) and the support member are integrated with each other.

The polyurethane preferably comprises a reaction product of an isocyanate compound including a diisocyanate and a trifunctional or higher polyfunctional isocyanate, and an alcohol including a trifunctional or higher polyfunctional alcohol. The method for producing the elastic member for instance has a step of obtaining a prepolymer by reacting an isocyanate compound and a polyol, a step of mixing an alcohol including a polyol and a trifunctional or higher polyfunctional alcohol, as a curing agent, and a catalyst, with the obtained prepolymer, to obtain a polyurethane starting material composition, and a step of curing the obtained polyurethane starting material composition, to yield an elastic member.

In the step of obtaining a prepolymer, the reaction is preferably conducted so that the NCO content is preferably about 5 to 30 mass %, more preferably about 8 to 15 mass %. The reaction temperature is preferably about 50 to 120° C., more preferably about 70 to 90° C. The reaction time is preferably about 30 minutes to 400 minutes, more preferably about 120 minutes to 300 minutes.

When curing the polyurethane starting material compositions, for example, it is preferably to cure them at 100 to 180° C., for about 1 to 5 minutes.

The contents of respective materials in the polyurethane starting material composition are not particularly limited so long as the above tan δ and M2/M1 are satisfied. For example, the content ratio of diisocyanate in the polyurethane starting material composition is preferably 2 to 30 mass %, more preferably 10 to 25 mass %. The content ratio of the trifunctional or higher polyfunctional isocyanate in the polyurethane starting material composition is preferably 5 to 35 mass %, more preferably 10 to 20 mass %. The content ratio of the polyol in the polyurethane starting material composition is preferably 30 to 80 mass %, more preferably 50 to 70 mass %. The content ratio of the trifunctional or higher polyfunctional alcohol in the polyurethane starting material composition is preferably 1 to 10 mass %, more preferably 2 to 5 mass %.

As the release agent there can be used a known release agent such as a fluorine-based release agent, a silicone-based release agent, or a surfactant; preferred herein is however a silicone-based release agent, for environmental, cost and performance considerations. For instance a mixture of a silicone oil and a silicone resin diluted with a solvent is used herein as the silicone-based release agent. For instance dimethyl silicone oil (ELEMENT14 PDMS series (product name, by Momentive Performance Materials Inc.)) can be used as the silicone oil, and for instance "SR1000", "SS4230" or "SS4267" (all product names, by Momentive Performance Materials Inc.) or "MQ803TF" (product name, by Wacker Asahikasei Silicone Co., Ltd.) can be used as a silicone resin. Any grade of the above-described silicone oils and silicone resins can be used in combination with a silicone oil. The ratio of nonvolatile fraction in the silicone resin is preferably 10 to 70 mass %.

A mold for cleaning blades made up of an upper die and a lower die is prepared, an adhesive is applied to one end of the support member, and the support member is disposed in a cavity for blade portion formation of the mold, so that the adhesive-coated portion protrudes into the cavity. A liquid polyurethane starting material composition, which is an elastic member starting material, is injected into this mold, through an opening thereof in a transverse-direction end face, and a curing reaction is conducted at 100° C. to 150° C., to obtain a molded product in which the support member and the elastic member are integrated with each other. A cleaning blade can be produced by cutting the elastic member to a predetermined shape (this is hereafter referred to as Production method I).

A mold for cleaning blades made up of an upper die and a lower die is prepared, an adhesive is applied to one end of each of two support members, and the support members are disposed, facing each other, in a cavity for blade portion formation of the mold, so that the adhesive-coated portion protrudes into the cavity. A liquid polyurethane starting material composition, which is an elastic member starting material, is injected into this mold, through an opening thereof in a transverse-direction end face, and a curing reaction is conducted at 100° C. to 150° C., to obtain a molded product in which two support members and the elastic member are integrated with each other. At the time of injection the mold is tilted by an angle of 0 to 250 so that the starting material composition flows first through one of the two support members. Then two cleaning blades can be produced (hereafter Production method II) by cutting the transverse-direction central portion of the elastic member portion of the resulting molded product so as to be separated into two portions, and then further cutting off the elastic member along both ends of the support member, in the longitudinal direction.

Another method can also be resorted to in which a polyurethane elastomer sheet is molded separately from the above polyurethane starting material composition, and is cut into a strip, to prepare an elastic member, whereupon a joining portion of the elastic member is overlaid on the support member having had an adhesive applied or affixed thereonto, with heating and pressing, to the elicit bonding of the whole.

<Process Cartridge and Electrophotographic Image Forming Apparatus>

The cleaning blade can be used by being built into a process cartridge that is configured to be removably fitted to an electrophotographic image forming apparatus. Specifically, for instance, a cleaning blade according to the present aspect can be used in a process cartridge that is provided with an image bearing member as the to-be-cleaned member, and with a cleaning blade disposed so as to be capable of cleaning the surface of the image bearing member. Such a process cartridge contributes to stable formation of high-quality electrophotographic images.

An electrophotographic image forming apparatus according to one aspect of the present disclosure includes an image bearing member such as a photosensitive member, and a cleaning blade disposed to be able to clean the surface of the image bearing member, wherein the cleaning blade is the above cleaning blade. Such an electrophotographic image forming apparatus can stably form high-quality electrophotographic images.

—Wiper Member for Vehicles—

The cleaning member according to the present disclosure can be used as a wiper blade for vehicle that wipes the surface of a to-be-cleaned member. That is, the cleaning member is preferably a wiper member for vehicle for a wiper device in a to-be-cleaned member such as vehicle windshields. The wiper blades for vehicle are used in automobiles, trains, vessels, aircraft and the like, for wiping off water droplets, dirt and so forth that are adhered to glass surfaces such as windshields and rear windows, for the purpose of ensuring thereby the operator's field of vision. The cleaning member that is used in a wiper blades for vehicle is required to exhibit sufficient followability, in order to wipe off, from glass surfaces having large-curvature portions and small-curvature portions, diverse cleaning targets that include liquid deposits, fine particles contained in exhaust gas, and dust from asphalt or the like. To wipe off a strongly adhered object to be cleaned off a glass surface it is necessary to suppress vibration that arises as the cleaning member warms up with use in hot environments and/or with long-term use.

Figure 3A:
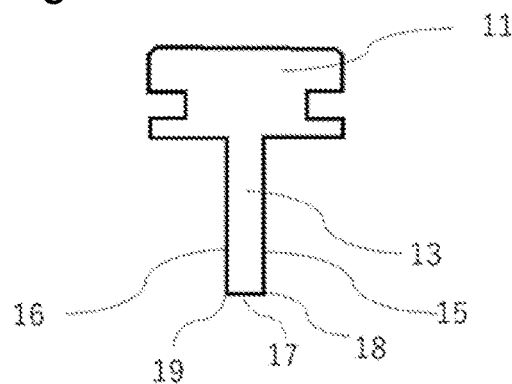
FIGS. 3A to 3D are a set of schematic cross-sectional diagrams of a wiper member for vehicle.
Figure 3B:
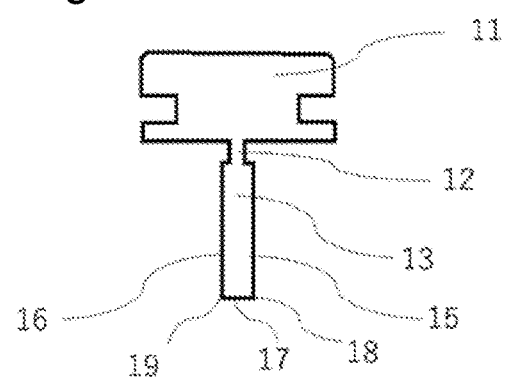

The wiper member for vehicle comprises a vehicle wiper support portion 11, and a lip portion (tip portion) 13, as illustrated in FIG. 3A. As illustrated in FIG. 3B, a neck 12 may be interposed between the support portion 11 and the lip portion 13, in order to allow the lip portion 13 to swing. For instance the width of the neck 12 may be set to be smaller than that of the vehicle wiper support portion 11 and of the lip portion 13, in a cross section of the wiper member for vehicle in a direction perpendicular to the longitudinal direction.

Figure 4A:
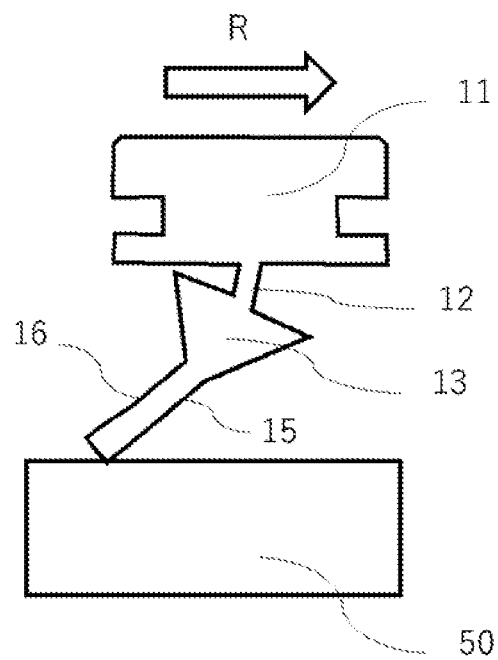
FIGS. 4A and 4B are a set of diagrams illustrating a state during a cleaning process of a wiper member for vehicle.
Figure 4B:
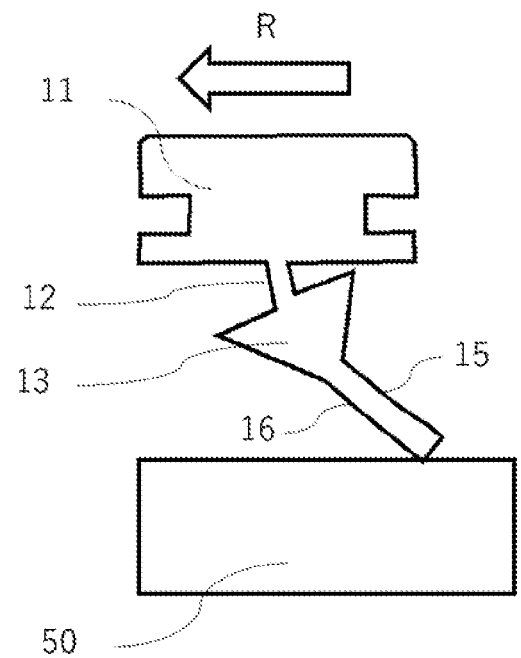

As illustrated in FIG. 4A, the lip portion 13 of the wiper member for vehicle is tilted in the wiping direction, such that part of the lip portion is brought into contact with the surface of the to-be-cleaned member. In a case in particular where the neck 12 is provided as illustrated in FIG. 4B, the lip portion 13 tilts in the wiping direction, starting from the neck, such that part of the lip portion is brought into contact with the surface of the to-be-cleaned member.

Figure 3C:
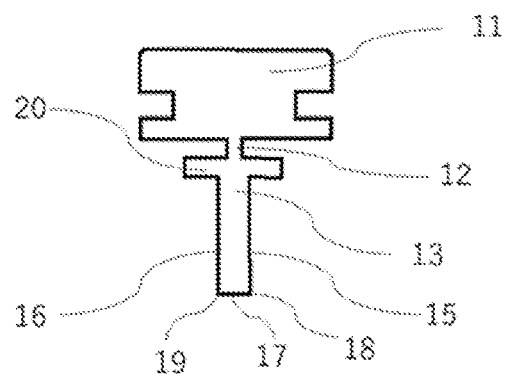
Figure 3D:
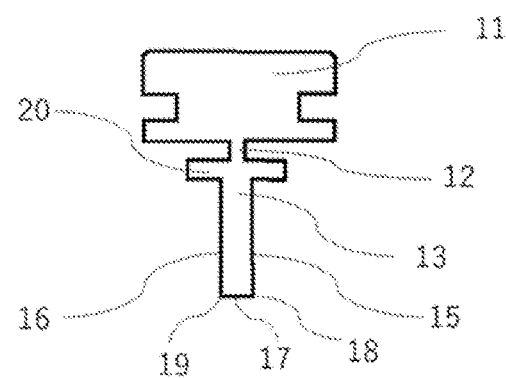

In order to properly control the tilt of the lip portion relative to the to-be-cleaned member at the time of wiping, the cross section of the lip portion 13 in a direction perpendicular to the longitudinal direction of the wiper member for vehicle may have a shoulder portion 20, on the side closer to the vehicle wiper support portion 11, as illustrated in FIG. 3C. The shoulder portion may be configured in the form of a tapered shape 14 the width whereof gradually decreases from the side close to the support portion 11 in a direction bearing away from the support portion 11, as illustrated in FIG. 3D. By virtue of having such a shoulder portion, the lip portion tilts such that the vehicle wiper support portion and the shoulder portion come into contact during wiping. As a result it becomes possible to control stably the tilt and the angle of the lip portion relative to the to-be-cleaned member during wiping.

The wiper member for vehicle is formed to have a substantially uniform cross-sectional shape in the longitudinal direction. FIG. 4A and FIG. 4B are explanatory diagrams illustrating a state during the cleaning process by the wiper member for vehicle.

In FIG. 4A the lip portion 13 of the wiper member for vehicle has: a first lip surface 15 in contact with the to-be-cleaned member 50, and a second lip surface 16 on the reverse side from that of the first lip surface 15; and a leading end surface 17 which, together with the first lip surface 15 and the second lip surface 16, makes up a first edge 18 and a second edge 19, on the side of the lip portion 13 lying farthest from the support portion 11 (see FIGS. 3A to 3D concerning the first edge 18, the second edge 19 and the leading end surface 17).

In FIG. 4B the lip portion 13 of the wiper member for vehicle has the second lip surface 16, and the first lip surface 15 on the reverse side from that of the second lip surface 16, and a leading end surface 17 which, together with the first lip surface 15 and the second lip surface 16, makes up a first edge 18 and a second edge 19, on the side of the lip portion 13 lying farthest from the support portion 11 (see FIGS. 3A to 3D concerning the first edge 18, the second edge 19 and the leading end surface 17).

The arrows R indicate the cleaning direction of the wiper member for vehicle. Through switching from cleaning in the direction of arrow R in FIG. 4A to cleaning in the direction of arrow R in FIG. 4B, the surface that comes into contact with the to-be-cleaned member changes over from the first lip surface 15 to the second lip surface 16.

In the wiper blade for vehicle, a peak temperature of a peak exhibiting a maximum value of tan δ, as measured in accordance with the above-described method using a sample for measurement of the loss factor tan δ and produced, from an elastic member at the lip portion which is a contact portion with the to-be-cleaned member, so that the sample includes the contact region with the to-be-cleaned member, and the maximum value of the peak, satisfy the above-described relationships. As a result there is suppressed resinization of the contact portion of the wiper blade for vehicle that comes into contact with the to-be-cleaned member, in an actual operating temperature range, at the time of cleaning of a wiper blade for vehicle, and there is maintained uniform contact over the longitudinal direction, thanks to which sufficient followability can be brought out.

Furthermore, it is preferable that the wiper member for vehicle has at least the vehicle wiper support portion and the lip portion that comes in contact with the surface of a windshield, since in that case the uniformity of contact in the longitudinal direction is improved, and it suppresses vibration by developing sufficient vibration damping properties.

Furthermore, it is preferable that the wiper member for vehicle has at least a vehicle wiper support portion and a lip portion that comes in contact with the surface of a windshield, and a shoulder portion on the lip portion, on the side of the vehicle wiper support portion, since in that case the uniformity of contact in the longitudinal direction is further improved, and it suppresses vibration by developing sufficient vibration damping properties.

Furthermore, it is preferable that the wiper member for vehicle has at least a vehicle wiper support portion, and a lip portion that is swingably connected to the vehicle wiper support portion via a neck, since in that case the uniformity of contact in the longitudinal direction is further improved, and it suppresses vibration by developing sufficient vibration damping properties.

Moreover, in the wiper blade for vehicle, the loss factor tan δ satisfies the above condition for which there is used a sample of the elastic member at the lip portion which is the contact portion with the to-be-cleaned member. As a result, the wiper blade for vehicle affords sufficient vibration damping properties, which allow suppressing vibration, at the time of cleaning by the wiper blade for vehicle, even when the cleaning member heats up on account of being used in a hot environment and/or being used over long periods of time.

<Method for Producing a Vehicle Wiper Blade>

The method for producing the wiper blade for vehicle is not particularly limited, and can be selected from among known methods. For instance, a lip portion having a tapered section can be obtained through injection of a starting material composition of a polyurethane elastomer into a mold for wiper blades for vehicle, and through heat-curing of the composition.

The tip of the tapered section may be shaped by cutting. Doing so is preferable since that way the first edge and the second edge can be molded to high smoothness. Alternatively, a pair of tandem-shaped molded bodies may be produced in forms so that the tapered sections are in contact while facing each other, the molded bodies being then cut in the longitudinal direction to produce as a result respective wiper blades for vehicle. The blade support portion and the neck may be produced using conventionally known materials and relying on conventionally known production methods.

<Overall Process Including a Wiper Arm>

The wiper blade for vehicle of the present disclosure can be used in various types of wiper systems, for instance of tandem type or of opposed wiping type.

—Cleaning Wiper Blade (Wiping Cleaning Member)—

The elastic member of the cleaning member for wiping according to the present disclosure is brought into contact with the surface of the to-be-cleaned member, to clean thereby the surface of the to-be-cleaned member. The cleaning member can be used as a cleaning wiper blade for cleaning surfaces typified for instance by window glass, tiles, walls, lenses and solar panels. The cleaning wiper blade is required to have sufficient followability in terms of suppressing uneven wiping, even without application of strong pressure against a surface to be cleaned. To wipe a strongly adhered object to be cleaned from the surface to be cleaned it is necessary to suppress vibration, derived from heating-up of the cleaning member on account of the strong pressure that is applied in that case.

Figure 5A:
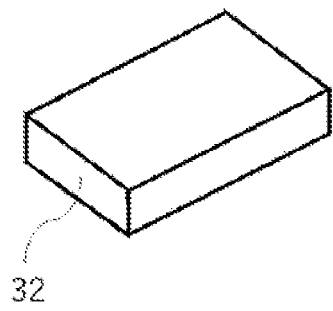
FIGS. 5A to 5E are a set of schematic diagrams of a cleaning wiper blade.

As illustrated in FIG. 5A, the cleaning wiper blade has an elastic member 32 that is pressed against the surface to be cleaned, such that a portion of the elastic member is brought into contact with the surface of the object to be cleaned, to thereby clean the surface of the object to be cleaned.

Figure 5B:
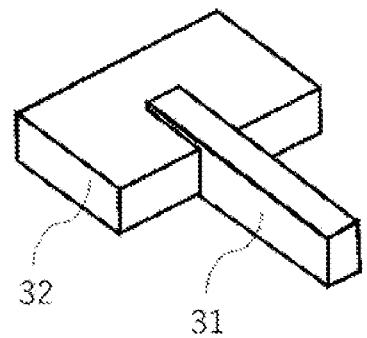
Figure 5C:
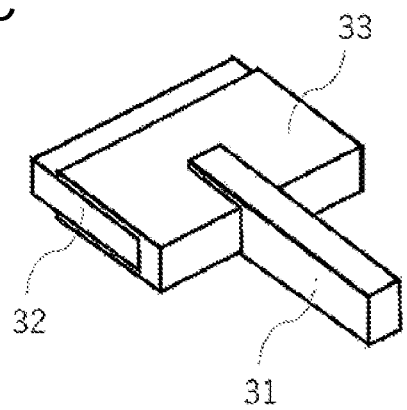

Although FIG. 5A illustrates only the elastic member 32, preferably there is provided an elastic member support portion 33 that supports the elastic member over the longitudinal direction of the elastic member (for the purpose of stably pressing in the longitudinal direction of the cleaning wiper blade), as depicted in FIG. 5C.

As illustrated in FIG. 5B, there may be provided a grip portion 31 that can be gripped, and an elastic member 32 that is supported by the grip portion 31 and that is pressed against the surface to be cleaned. As illustrated in FIG. 5C, the elastic member support portion 33 that supports the elastic member 32 may be provided between the grip portion 31 and the elastic member 32.

The grip portion 31 is a portion that can be gripped or held by the agent that performs the cleaning work, typified by a hand. The grip portion 31 extends in a direction that intersects the direction in which the elastic member 32 extends. The shape of the is not particularly limited, as long as the grip portion 31 can be gripped or held by the agent of the cleaning work. A jig for cleaning assistance may be connected to the grip portion. Examples of the jig include a jig that extends the grip portion, for the purpose of for cleaning a high place. The material of the grip portion 31 is not particularly limited, and the grip portion 31 may be made up of a resin or a metal.

Figure 5D:
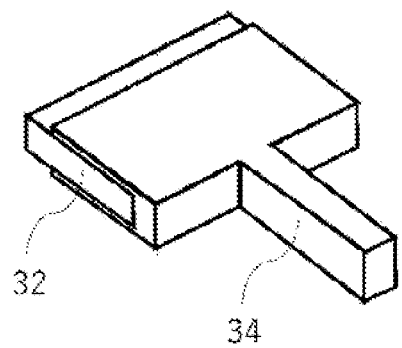
Figure 5E:
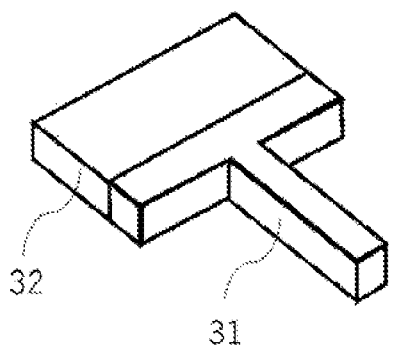

For instance as illustrated in FIG. 5D, a support grip portion 34 may be provided at which the elastic member support portion and the grip portion are integrated with each other. For instance the support grip portion 34 may be shaped so as to clamp part of the elastic member 32. As illustrated in FIG. 5E, the elastic member 32 and the grip portion 31 may be integrated with each other. The grip portion 31, the elastic member support portion 33 and the elastic member 32 may each be removable, or may be integrated with the others.

In the cleaning wiper blade a peak temperature of a peak exhibiting a maximum value of tan δ, as measured in accordance with the above-described method using a sample for measurement of the loss factor tan δ and produced, from the elastic member 32 at the contact region with the to-be-cleaned member, so that the sample includes the contact region with the to-be-cleaned member, and a maximum value of the peak, satisfy the above-described relationships. As a result, the width of contact of the cleaning member against the surface to be cleaned becomes narrower even when cleaning is performed without strong pressing being applied by the cleaning wiper blade. If the loss factor of the elastic member lies within the above range, sufficient followability can be brought out over this narrow contact width, and as a result the applied force concentrates in the contact region, such that the phenomenon whereby deposits are simply wiped off the to-be-cleaned member does not occur, and thus the deposits can be scraped without being missed on account of peel-off.

Moreover, it is preferable that the cleaning wiper blade is provided with the elastic member support portion 33, since in that case followability is further improved through stable pressing of the cleaning wiper blade in the longitudinal direction. Furthermore, it is preferable that the cleaning wiper blade is provided with the grip portion 31 that is gripped, since in that case the cleaning wiper blade can be stably pressed in the longitudinal direction, which further improves followability as a result.

<Method for Producing an Elastic Member of a Cleaning Wiper Blade>

The method for producing the elastic member of the cleaning wiper blade is not particularly limited, and can be selected from among known methods. For instance the elastic member of the cleaning wiper blade can be obtained through injection of a starting material composition of a polyurethane elastomer into a mold for an elastic portion of the cleaning wiper blade, and through heat-curing of the composition.

The tip of the elastic portion may be shaped by cutting. Doing so is preferable since in that case the tip side edge can be formed with high smoothness. Alternatively, a pair of tandem-shaped molded bodies may be produced in which the leading end faces of the elastic portions are in contact while facing each other, the molded bodies being then cut in the longitudinal direction to produce as a result respective cleaning wiper blade.

<Method for Using a Cleaning Wiper Blade>

Figure 6A:
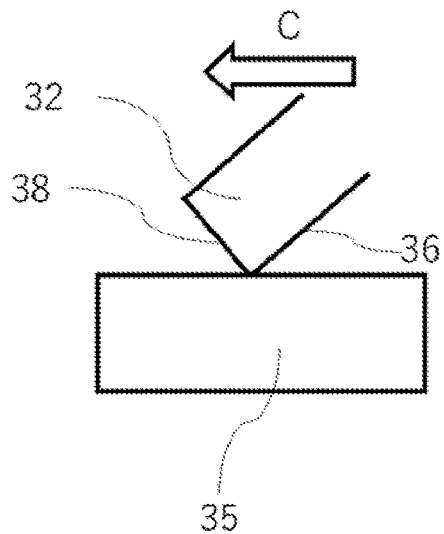
FIGS. 6A and 6B are a set of explanatory diagrams of a process in which a cleaning wiper blade cleans a to-be-cleaned member.
Figure 6B:
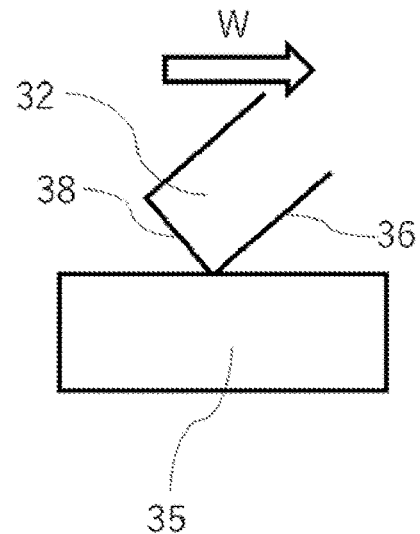

A method for using the cleaning wiper blade will be explained next. To remove dirt, the cleaning work agent holds the grip portion 31 or support grip portion 34, the cleaning wiper blade is moved in a direction that intersects the direction in which the elastic member 32 extends, while pushing the elastic member 32 against the to-be-cleaned member. FIGS. 6A and 6B illustrate an explanatory diagram of the state of the cleaning process in which the cleaning wiper blade is in contact with, and slides on, the to-be-cleaned member 35, at the time of cleaning.

The direction in which the cleaning wiper blade is moved is for instance a direction intersecting the direction in which the elastic member 32 extends; herein, the cleaning wiper blade can for instance be used by being moved in direction C of pushing, illustrated in FIG. 6A, and direction W of pulling, illustrated in FIG. 6B. For instance the tip side edge made up of the lip surface 36 and the leading end surface 38 may be caused to move while in contact against the to-be-cleaned member 35. Dirt may be moistened beforehand using a liquid detergent, water or the like, and may be removed together with the liquid detergent, water or the like.

<Shape of Cleaning Wiper Blade>

The shapes and manner of attachment of the elastic member 32, the elastic member support portion 33, and the grip portion 31 or the support grip portion 34, in the cleaning wiper blade, are not limited. Likewise, the manner in which the elastic member support portion 33 is attached to the elastic member 32, and the manner in which the grip portion 31 or support grip portion 34 is attached to the elastic member support portion 33, are not limited.

EXAMPLES

Below, the present disclosure will be described by manufacturing examples, Examples, and Comparative Examples, however, the present disclosure is not limited to the Examples, and the like at all. For other materials than those shown in Examples and Comparative Examples, a reagent or an industrial chemical was used.

<Electrophotographic Cleaning Member>

In the present example a cleaning blade of integral molding type illustrated in FIG. 1 was produced and was evaluated. Incidentally, all the expressions "part(s)" in Examples and Comparative Examples are based on mass unless otherwise specified.

Example 1

[Support Member]

A galvanized steel sheet having a thickness of 1.6 mm was prepared and processed to obtain a support member, having an L-shaped cross section, denoted by reference symbol 3 in FIG. 2. A urethane-metal one-layer adhesive (product name: Chemlock 219, by LORD Corporation) was applied onto the site of the support member with which the elastic member came into contact.

[Preparation of an Elastic Member Starting Material]

The materials given in Table 1 below were mixed and caused to react at a temperature of 80° C. for 3 hours, to yield a prepolymer having an NCO content of 10.2 mass %.

TABLE 1

| | Material | Amount |
|---|---|---|
| Isocyanate | 4,4''-diphenylmethane diisocyanate (product name: Millionate MT, by Tosoh Corporation) (hereafter "4,4'-MDI") | 188.3 g |
| | Polymeric MDI (product name: Millionate MR-200, by Tosoh Corporation) (hereafter "MR200") | 210.0 g |
| Polyol | Butylene adipate polyester polyol (product name: Nippollan 3027, by Tosoh Corporation, number average molecular weight 2500) (hereafter "PBA2500") | 601.7 g |

A curing agent was prepared by mixing the materials given in Table 2 below.

TABLE 2

| Material | Amount |
| --- | --- |
| Trimethylolpropane (by Tokyo Kasei Kogyo Co., Ltd.) (hereafter "TMP") | 53.9 g |
| Hexylene adipate polyester polyol (product name: Nippollan 164, by Tosoh Corporation, number average molecular weight 1000) (hereafter "PHA1000") | 305.3 g |
| Polycat 46 (product name, by Air Products Japan) | 0.16 g |
| N,N,N'-trimethylaminoethyl ethanolamine (product name: TOYOCAT-RX5, by Tosoh Corporation) (hereafter "RX5") | 1.26 g |

The above curing agent was added to the above prepolymer, with mixing to yield a starting material composition.

The adhesive-coated portion of the support member was disposed so as to protrude into the cavity of the mold for molding a cleaning blade (Production method I). The starting material composition was injected into the cavity, and was cured at a temperature of 130° C. for 2 minutes. This was followed by demolding, to yield an integral molded body of the polyurethane and the support member.

Prior to molding, the interior of the cavity was coated beforehand with a release agent A. Release agent A is a mixture of materials given in Table 3 below.

TABLE 3

| Material | Amount |
| --- | --- |
| "ELEMENT 14 PDMS 1000-JC" (product name, by Momentive Performance Materials Inc.) | 5.06 g |
| "ELEMENT 14 PDMS 10K-JC" (product name, by Momentive Performance Materials Inc.) | 6.19 g |
| "SR1000" (product name, by Momentive Performance Materials Inc.) | 3.75 g |
| "EXXSOL DSP145/160" (product name, by Andoh Parachemie Co., Ltd.) | 85 g |

The polyurethane of the obtained integral molded body was cut in such a manner that the edge angle was angle 90 degrees, and the distance of the polyurethane in the transverse direction, the thickness direction and the longitudinal direction, was 7.5 mm, 1.8 mm and 240 mm, respectively, to yield the cleaning blade according to the present example. This cleaning blade was then evaluated as follows.

<Method for Measuring the Loss Factor tan δ (Viscoelasticity)>

The loss factor tan δ (viscoelasticity) was measured in accordance with Japanese Industrial Standard (JIS) K 6394: 2007 ("Rubber, vulcanized or thermoplastic—Determination of dynamic properties—General guidance").

The measurement conditions are described below.
Device: dynamic viscoelasticity measuring device (product name: DMA EXPLEXOR 500N, by NETZSCH-Geraetebau GmbH);
Static strain: 2%;
Dynamic strain: 0.5%;
Measurement temperature: −20° C. to 60° C.;
Measurement frequency: 10 Hz A sample for measuring the loss factor tan δ was prepared as follows.

The sample was prepared so as to include the angle of the contact region of the elastic member with the to-be-cleaned member. The sample was produced by cutting out a 0.5 mm, 1.0 mm and 30 mm cuboid.

<Measurement of M1, M2 and M3>

Herein M1 to M3 were calculated relying on a direct sample introduction method (DI method) in which a sample is introduced directly into an ion source, bypassing a gas chromatograph (GC).

The apparatus used herein was an ion trap-type GC/MS (product name: POLARIS Q, by Thermo Fisher Scientific Inc.), with a direct exposure probe (DEP) being used as a direct introduction probe. The surface of the contact region with the to-be-cleaned member was measured in accordance with the following method. In sampling, members of polyurethane or the like were cut using a biocutter. Specifically, each member was cut out so as to include a contact region with the to-be-cleaned member. In a case where there were multiple contact regions, each of these was cut out.

Then about 0.1 μg of the sample having been sampled from the surface of the contact region with the to-be-cleaned member was fixed to a filament positioned at the tip of the probe, and the whole was directly inserted into an ionization chamber. The sample was thereafter rapidly heated from room temperature to 1000° C. at a constant ramp rate (10° C./s), and the vaporized gas was detected using a mass spectrometer.

The total of the integrated intensities of all peaks in an obtained total ion current thermogram was taken as a detected amount M1 of all ions, and the total of the peak integrated intensities of the extracted ion thermogram corresponding to a range of the m/z value derived from a trifunctional or higher polyfunctional isocyanate was taken as M2; thereupon, (M2/M1) was calculated using the above M1 and M2.

Herein, the polyurethane according to the present example was synthesized using polymeric MDI (MR200) as a trifunctional or higher isocyanate. In an extracted ion thermogram of such a polyurethane, obtained in accordance with the above method, there were detected peaks derived from a cation product of polymeric MDI, having peak tops at positions for a range where an m/z value derived from n=1 in the structure represented by Chemical formula (1)' is 380.5 to 381.5, a range where an m/z value derived from n=2 is 511.5 to 512.5, a range where an m/z value derived from n=3 is 642.5 to 643.5, and a range where an m/z value derived from n=4 is 773.5 to 774.5. The total of these integrated intensities was taken as M2 in the present example.

In other examples described below, TTI used as a trifunctional or higher functional isocyanate has a structure represented by Chemical formula (3) below. In the extracted ion thermogram of a polyurethane synthesized using TTI, and obtained in accordance with the above method, there was detected a peak derived from a cation product of TTI, having a peak top at an m/z position of 366.5 to 367.5. In the present example, therefore, this peak integrated intensity was taken as M2.

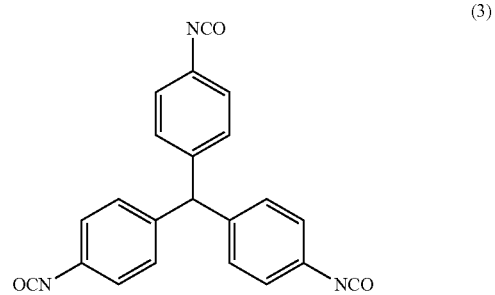

(3)

Similarly, tris(phenylisocyanate)thiophosphate (TPTI), used as the trifunctional or higher polyfunctional isocyanate in a below-described example, has a structure represented by Chemical formula (4). In the extracted ion thermogram of a polyurethane synthesized using TPTI, and obtained in accordance with the above method, there was detected a peak derived from a cation product of TPTI, having a peak top at an m/z position of 464.5 to 465.5. This peak integrated intensity was taken as M2 in the present example.

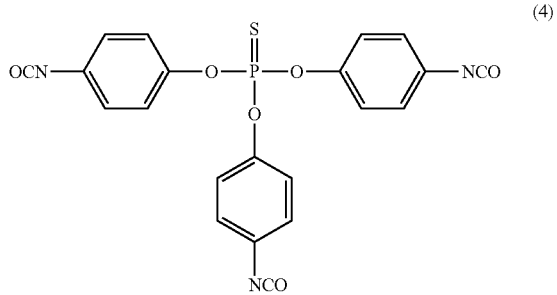

(4)

In the case by contrast of 4,4'-MDI, which is a diisocyanate, a structure represented by Chemical formula (2) above was cationized and the resulting product was detected, in a range of m/z of 249.5 to 250.5, of the structure represented by Chemical formula (2) and derived from 4,4'-MDI. The peak integrated intensity of the extracted ion thermogram corresponding to this structure was taken as (M3).

<Followability Evaluation Method>

A cleaning blade of Example 1 was built into a cyan cartridge of a color laser beam printer (product name: HP LaserJet Enterprise Color M553dn, by The Hewlett-Packard Company) as a cleaning blade for a photosensitive drum which was herein the to-be-cleaned member. The toner in the developing machine of the cyan cartridge was wholly replaced with Toner 1 described below.

After standing in a low-temperature, low-humidity environment (temperature of 15° C., relative humidity of 10%) for 24 hours, 12,500 images, as the number of printable sheets, were formed in that environment (hereafter also referred to as "normal evaluation"). In the developing machine that was used the toner was then replaced with a new cyan cartridge having had all the toner thereof replaced with Toner 1; then 12,500 images, as the number of printable sheets, were formed once more (hereinafter referred to as "double evaluation").

A hole was opened at the back of the cartridge, and the evaluation was carried out while sucking out waste toner as appropriate. The performance of the obtained images was rated according to the following evaluation criteria.

A: Image defects (streaks on the image) caused by the cleaning blade do not occur in either the normal evaluation or the double evaluation.

B: Image defects (streaks on image) caused by the cleaning blade do not occur in the normal evaluation, but occur slightly in the double evaluation (streak length of 5 mm or less).

C: Image defects (streaks on the image) caused by the cleaning blade do not occur in normal evaluation, but do occur in the double evaluation (in excess of 10 mm); alternatively, image defects occur also in the normal evaluation.

<Chatter Evaluation Method>

A cleaning blade of Example 1 was built into a cyan cartridge of a color laser beam printer (product name: HP LaserJet Enterprise Color M553dn, by The Hewlett-Packard Company) as a cleaning blade for a photosensitive drum which is herein the to-be-cleaned member. The toner in the developing machine of the cyan cartridge was wholly replaced with Toner 1 described below.

After standing in a high-temperature, high-humidity environment (temperature of 30° C., relative humidity of 80%) for 24 hours, 12,500 images, as the number of printable sheets, were formed in that environment (hereafter referred to as "normal evaluation"). In the developing machine that was used the toner was then replaced with a new cyan cartridge having had all the toner thereof replaced with Toner 1; then 12,500 images, as the number of printable sheets, were formed once more (hereinafter referred to as "double evaluation").

In the evaluation performed under that environment, the temperature of the elastic member of the cleaning blade rose, reaching 55° C., on account of the operating heat of the laser beam printer itself and on account of the frictional heat at the contact region of the cleaning blade. Chatter at high temperature can be evaluated as a result.

A hole was opened at the back of the cartridge, and the evaluation was carried out while sucking out waste toner as appropriate. The performance of the obtained images was rated according to the following evaluation criteria.

A: Image defects (streaks on the image) caused by the cleaning blade do not occur in either the normal evaluation or the double evaluation; no abnormal noise occurs, either.

B: Image defects (streaks on the image) caused by the cleaning blade does not occur in the normal evaluation, but occur only slightly in the double evaluation (streak length of 5 mm or less); no abnormal noise occurs.

C: Image defects (streaks on the image) caused by the cleaning blade does not occur in normal evaluation, but did occur in double evaluation (in excess of 10 mm); alternatively, image defects occur even in normal evaluation; alternatively, abnormal noise occurs.

<Method for Producing Toner 1>

Unless otherwise specified, the language "parts" refers hereafter to mass basis throughout.

(Step of Preparing Aqueous Medium 1)

Herein 14.0 parts of sodium phosphate (dodecahydrate, by Rasa Industries, Ltd.) were added to 650.0 parts of ion-exchanged water in a reaction vessel equipped with a stirrer, a thermometer and a reflux tube, and the whole was held for 1.0 hour at 65° C. while under purging with nitrogen. An aqueous solution of calcium chloride resulting from dissolving 9.2 parts of calcium chloride (dihydrate) in 10.0 parts of ion-exchanged water was charged all at once, while under stirring at 15000 rpm using a T. K. Homomixer (by Tokushu Kika Kogyo Co., Ltd.), to prepare an aqueous medium that contained a dispersion stabilizer. Then 10 mass % hydrochloric acid was inputted into the aqueous medium, to adjust the pH to 5.0, and yield Aqueous medium 1.

(Step of Preparing a Polymerizable Monomer Composition)

Styrene: 60.0 parts

C. I. Pigment Blue 15:3:6.5 parts

The above materials were charged into an attritor (by Mitsui Miike Machinery Co., Ltd.), with further dispersion at 220 rpm for 5.0 hours using zirconia particles having a diameter of 1.7 mm, to prepare a pigment dispersion. The following materials were added to the pigment dispersion.

Styrene: 20.0 parts n-butyl acrylate: 20.0 parts

Crosslinking agent (divinylbenzene): 0.3 parts

Saturated polyester resin: 5.0 parts (Polycondensate (molar ratio 10:12) of propylene oxide-modified bisphenol A (2-mole adduct) and terephthalic acid, glass transition temperature Tg=68° C., weight-average molecular weight Mw=10000, molecular weight distribution Mw/Mn=5.12)

Fischer-Tropsch wax (melting point 78° C.): 7.0 parts

The resulting product was held at 65° C., with dissolution and dispersion to homogeneity at 500 rpm, using T. K. Homomixer (by Tokushu Kika Kogyo Co., Ltd.), to prepare a polymerizable monomer composition.

(Granulation Step)

While holding the temperature of Aqueous medium 1 at 70° C. and holding the rotational speed of the T. K. Homomixer at 15000 rpm, the polymerizable monomer composition was inputted into Aqueous medium 1, and 10.0 parts of the polymerization initiator t-butyl peroxypivalate were added. The whole was granulated, as it was, for 10 minutes in the stirring device, while maintaining 15000 rpm.

(Polymerization/Distillation Step)

After the granulation step, the stirrer was replaced by a propeller stirring blade, and polymerization was conducted for 5.0 hours with the temperature held at 70° C. and while under stirring at 150 rpm; the polymerization reaction was then conducted by raising the temperature to 85° C. and by heating for 2.0 hours.

Thereafter, the reflux tube of the reaction vessel was replaced with a cooling tube, and the resulting slurry was heated up to 100° C.; as a result, distillation was conducted for 6 hours, to distill off unreacted polymerizable monomers, and yield a toner base particle dispersion.

(Polymerization of an Organosilicon Compound)

Herein 60.0 parts of ion-exchanged water were weighed into a reaction vessel equipped with a stirrer and a thermometer, and pH was adjusted to 4.0 using 10 mass % hydrochloric acid. The temperature was brought to 40° C. by heating while under stirring.

This was followed by addition of 40.0 parts of methyltriethoxysilane as an organosilicon compound, and stirring for 2 hours or longer, to conduct hydrolysis. The end point of hydrolysis was confirmed visually at the point in time where oil-water separation ceased and a single layer became formed; a hydrolysis solution of an organosilicon compound was then obtained through cooling.

The temperature of the obtained toner base particle dispersion was lowered down to 55° C., and thereafter 25.0 parts of the hydrolysis solution of the organosilicon compound were added thereto, to initiate polymerization of the organosilicon compound. After holding for 15 minutes, as it was, the pH was adjusted to 5.5 using a 3.0 mass % aqueous solution of sodium hydrogen carbonate. Stirring was continued, with the system as it was, at 55° C., with holding for 60 minutes, after which pH was adjusted to 9.5 using a 3.0 mass % aqueous solution of sodium hydrogen carbonate, with further holding for 240 minutes, to yield a toner particle dispersion.

(Washing and Drying Step)

Once the polymerization step was over, the toner particle dispersion was cooled, and hydrochloric acid was added to the toner particle dispersion, to adjust the pH to 1.5 or lower, whereupon the dispersion was allowed to stand for 1 hour while under stirring, followed by solid-liquid separation using a pressure filter, to yield a toner cake. This toner cake was reslurried with ion-exchanged water to form a dispersion once more, whereupon solid-liquid separation was carried out using the above filter, to yield a toner cake.

The obtained toner cake was dried in a thermostatic bath at 40° C. for 72 hours, and was classified, to yield Toner 1.

Example 2

The same procedure as in Example 1 was carried out but herein 1.32 g of RX3 (product name: TOYOCAT-RX3, by Tosoh Corporation) were used as the catalyst, instead of using RX5.

Example 3

A curing agent was prepared by mixing 43.1 g of TMP, 244.3 g of PHA1000, 0.13 g of Polycat 46, and 1.01 g of RX5.

The mold that was used was a mold that was coated with release agent B prior to injection of the above polyurethane elastomer composition. As Release agent B there was used a mixture of 3.04 g of ELEMENT14 PDMS 1000-JC (product name, by Momentive Performance Materials Inc.), 3.71 g of ELEMENT14 PDMS 10K-JC (product name, by Momentive Performance Materials Inc.), 8.25 g of SR1000 (product name, by Momentive Performance Materials Inc.) and 85 g of EXXSOL DSP145/160.

A blade was produced in accordance with the process in Production method II. The inclination angle of the mold was set to 0°. The above polyurethane elastomer composition was injected into the cleaning blade mold, was cured at 130° C. for 2 minutes, and was thereafter demolded, to obtain an integral molded body of polyurethane and a support member. Otherwise, the cleaning blade of Example 2 was obtained in the same way as in Example 1. Physical properties were measured and evaluated in the same way as in Example 1.

Examples 4 to 14, Comparative Examples 1 and 2

Cleaning blades of Examples 4 to 14 and the cleaning blades of Comparative examples 1 and 2 were obtained in the same way as in Example 1 or 3, but herein the types of materials, compounding amounts and production method were modified as given in in Tables 4 and 5. Physical properties were measured and evaluated in the same way as in Example 1; the results are set out in Tables 4 and 5.

Vehicle wiper blades of examples and comparative examples were produced and evaluated next.

Example 15

<Preparation of a Starting Material for Vehicle Wiper Blades>

The same procedure as in Example 1 was carried out herein.

<Production of a Vehicle Wiper Blade>

The prepared starting material composition for wiper blades for vehicle was injected into a mold for wiper blades for vehicle, was cured at 130° C. for 2 minutes, and was then demolded, to yield a polyurethane. The mold that was used was a mold coated with mold release agent A, in the same way as in Example 1, prior to injection of the starting material composition.

A wiper blade was obtained by cutting as appropriate the tip end side of the polyurethane lip portion.

The distances of the lip portion tip in the thickness direction and in the longitudinal direction were set to 0.6 mm and 450 mm, respectively. The distances of the neck portion in the thickness direction and in the transverse direction were set to 0.7 mm and 0.5 mm, and the distance of the shoulder portion in the thickness direction was set to 3.0 mm. The obtained wiper blade was evaluated in accordance with the following methods.
<Viscoelasticity Measurement>
The same procedure as in Example 1 was carried out herein.
<Calculation of M1, M2 and M3>
The same procedure as in Example 1 was carried out herein.
<Evaluation of Followability>
The followability of the wiper blade for vehicle was evaluated using a test device for wiping performance testing pursuant to JIS D5710. In this test, firstly a wiper blade for vehicle is attached to the test device, and a silicone oil (product name: KF-96-50cs, by Shin-Etsu Chemical Co., Ltd.) is applied to the entire surface to be wiped on a glass surface as the to-be-cleaned member, in a state thus simulating an oil film; cleaning is then performed under the conditions below. The test device was then allowed to stand in a low-temperature, low-humidity environment (temperature of 15° C., relative humidity of 10%) for 24 hours, and thereafter cleaning was performed under the following conditions.

The wiping streak state of the glass surface after one reciprocation of the wiper blade for vehicle was observed from the rear side of the surface to be cleaned, and the influence on gloss unevenness and visibility were assessed visually. The results were calculated in the form of the ratio (hereafter referred to as silicone oil film removal area ratio (%)) of the surface area of the portion from which the silicone oil film was removed relative to the surface area of the surface wiped by the wiper blade for vehicle.

Followability performance was evaluated according to the following criteria on the basis of the calculated oil film removal area ratio.
[Wiping Conditions]
Load applied to the wiper blade for vehicle: 10 N/m
Wiping reciprocating speed of the wiper blade for vehicle: 50 reciprocations/min
[Evaluation Criteria]
Rank A: Silicone oil film removal area ratio of 95% or higher
Rank B: Silicone oil film removal area ratio from 90% to less than 95%
Rank C: Silicone oil film removal area ratio from less than 85% to less than 90%
Rank D: Silicone oil film removal area ratio lower than 85%
<Evaluation of Chatter>
The same operations as in the evaluation of followability were carried out, but now the standing environment of the test machine was modified to a high-temperature, high-humidity humidity environment (temperature of 50° C., relative humidity of 70%), while the evaluation criterion for evaluating vibration was herein ascertainment of the occurrence of abnormal noise by ear. The contact region in the wiper blade for vehicle was softened through modification of the standing environment to a high-temperature, high-humidity environment. By increasing the contact area with the glass surface, frictional forces were caused to increase, so that the temperature of the contact region of the wiper blade for vehicle was raised to 55° C. due to the heat generated by the frictional forces.
[Evaluation Criteria]
Rank A: No abnormal noise occurs
Rank B: Virtually no abnormal noise occurs
Rank C: Abnormal noise occurs Examples 16 to 19, 22 and 23

A wiper blade for vehicle was produced and evaluated in the same way as in Example 15, but herein the materials for the curing agent and the compounding amounts thereof were as given in Table 6.

Example 20

A wiper blade for vehicle having a blade support portion, a lip portion, and a neck portion was produced and evaluated in the same way as in Example 15 but using herein a mold having a cavity shape that yielded a shape having a shoulder portion.

Example 21

A wiper blade for vehicle having a blade support portion and a lip portion was produced and evaluated in the same way as in Example 15 but using herein a mold having a cavity shape that yielded a shape having a neck portion and a shoulder portion.

Examples 24 to 30

Vehicle wiper blades were produced and evaluated in the same way as in Example 15, but herein the types and use amounts of various materials for the prepolymer and/or the types and use amounts of various materials for the curing agent were as given in Table 7.

Comparative Examples 3 and 4

Vehicle wiper blades were produced and evaluated in the same way as in Example 15, but herein the types and use amounts of various materials for the prepolymer and/or the types and use amounts of various materials for the curing agent were as given in Table 7.

The physical properties of the wiper blades for vehicle obtained in Examples 16 to 30 and Comparative Examples 3 and 4 were measured and evaluated in the same way as in Example 15. The results obtained are given in Tables 6 and 7.

Cleaning wiper blades were produced and evaluated in the following examples.

Example 31

<Preparation of a Starting Material for Cleaning Wiper Blades>
The same procedure as in Example 1 was carried out herein.
<Production of a Cleaning Wiper Blade>
The prepared starting material composition for cleaning wiper blades was injected into a mold for cleaning wiper blades, was cured at 130° C. for 2 minutes, and was then demolded, to yield a polyurethane. The mold that was used was a mold that was coated with release agent A prior to injection of the above polyurethane elastomer composition, in the same way as in Example 1.

A leading end surface was produced by cutting as appropriate the tip end side of the lip portion of the obtained polyurethane molded body, to obtain an elastic portion of a cleaning wiper blade. The distances of the elastic portion of the cleaning wiper blade in the thickness direction, the transverse direction and the longitudinal direction were set to 1.8 mm, 20 mm and 300 mm, respectively. The obtained cleaning wiper blade was evaluated in accordance with the following methods.

<Viscoelasticity Measurement>

The same procedure as in Example 1 was carried out herein.

<Calculation of M1, M2 and M3>

The same procedure as in Example 1 was carried out herein.

<Evaluation of Followability>

Figure 7:
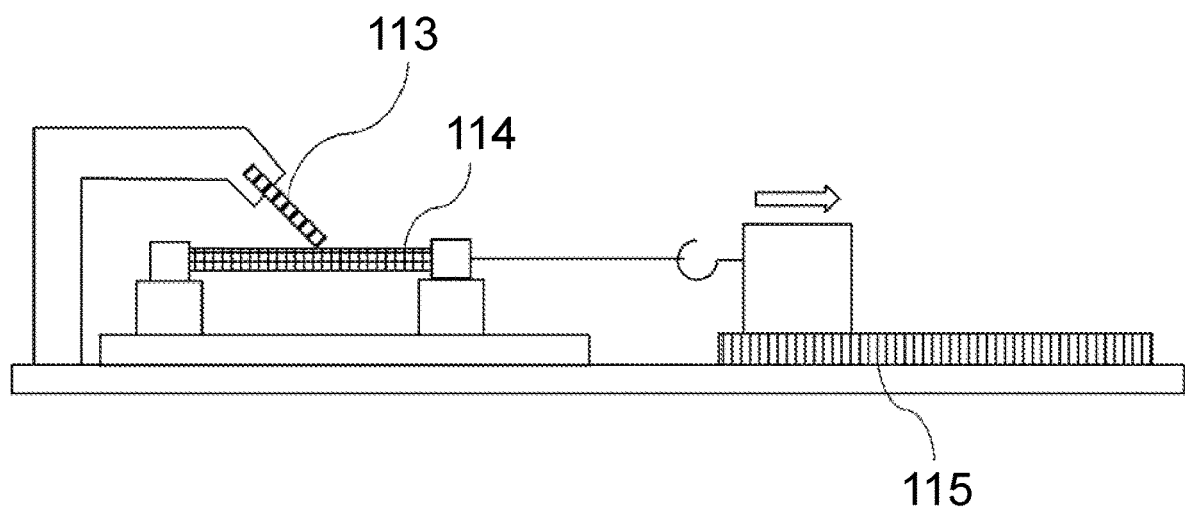
FIG. 7 is a schematic diagram of a test machine for followability evaluation.

The followability of the cleaning wiper blade was evaluated by bringing the elastic member of the cleaning wiper blade into contact with a glass surface and causing the blade to slide over the glass surface in reciprocating strokes with pull-back motion, and by observing the wiped state of dirt on the glass surface. FIG. 7 illustrates a schematic diagram of the test machine used for evaluation.

In this test, an elastic member 113 of a wiper blade was attached, as illustrated in FIG. 7, and a silicone oil (product name: KF-96-50cs, by Shin-Etsu Chemical Co., Ltd.) was applied to the entire surface of a glass plate 114 as a to-be-cleaned member, in a state thus simulating an oil film. The test device was then allowed to stand in a low-temperature, low-humidity environment (temperature of 15° C., relative humidity of 10%) for 24 hours, and thereafter cleaning was performed under the following conditions.

As illustrated in FIG. 7, the elastic member 113 of the cleaning wiper blade was brought into contact with the glass plate 114, and the glass plate 114 was pulled using an electric ROBO cylinder (product name: RCP4-SA5C, by IAI Corporation) 115, to thereby evaluate the followability on the glass surface under given conditions.

FIGS. 6A and 6B illustrate an enlarged-view diagram of a portion of contact of the elastic member of the cleaning wiper blade and the glass surface. As illustrated in FIGS. 6A and 6B, the elastic member 32 of the cleaning wiper blade was brought into contact with a glass surface 35, while adjusted so as to form an angle of 45 degrees with respect to the glass surface 35. The elastic member 32 of the cleaning wiper blade was attached so as to face in the direction W and the direction C denoted by the arrows in FIGS. 6A and 6B, with respect to the direction in which the glass surface was caused to move, and followability in each direction was evaluated.

In the evaluation of followability, the force with which the elastic member pressed against the glass surface per meter of length in the longitudinal direction was adjusted to 7 N/m. Followability was then evaluated by causing the glass surface coated with silicone oil to slide, observing of the state of wiping streaks on the glass surface, from behind the surface to be cleaned, and by visually assessing the influence on gloss unevenness and visibility.

The ratio of the surface area of the portion from which the silicone oil film was removed relative to the surface area of the surface wiped by the cleaning wiper blade (hereafter referred to as silicone oil film removal area ratio (%)) was calculated. Followability performance was evaluated in accordance with the following criteria, on the basis of the calculated silicone oil film removal area ratio. The results of the evaluation are given in Table 8 as the followability of the cleaning wiper blade.

[Wiping Conditions]
Cleaning wiper blade length: 300 mm
Glass plate moving speed: 10 mm/sec

[Evaluation Criteria]
Rank A: Oil film removal area ratio of 95% or higher
Rank B: Oil film removal area ratio from 90% to less than 95%
Rank C: Oil film removal area ratio lower than 90%

<Evaluation of Chatter>

The same operations as in the evaluation of the followability were carried out, but now the standing environment of the test machine was modified to a high-temperature, high-humidity humidity environment (temperature of 50° C., relative humidity of 70%); the evaluation criterion for evaluating vibration was herein ascertainment of the occurrence of abnormal noise by ear. The contact region in the cleaning wiper blade was softened by being allowed to stand in a high-temperature, high-humidity environment. By increasing the contact area with the glass surface, frictional forces were caused to increase, and the temperature of the contact region of the cleaning wiper blade was caused to rise to 55° C. due to the heat generated by the frictional forces.

[Evaluation Criteria]
Rank A: No abnormal noise occurs
Rank B: Virtually no abnormal noise occurs.
Rank C: Abnormal noise occurs Examples 32 to 44

Cleaning wiper blades were produced and evaluated in the same way as in Example 31, but herein the types and use amounts of various materials for the prepolymer and/or the types and use amounts of various materials for the curing agent were as given in Table 8 and Table 9.

Comparative Examples 5 and 6

Cleaning wiper blades were produced and evaluated in the same way as in Example 31, but herein the types and use amounts of various materials for the prepolymer and/or the types and use amounts of various materials for the curing agent were as given in Table 9.

The physical properties of the cleaning wiper blades obtained in Examples 32 to 44 and Comparative examples 5 and 6 were measured and evaluated in the same way as in Example 31. The results obtained are given in Tables 8 and 9.

Reference Examples 1 and 2

A polyurethane elastic body was produced in the same way as in Example 1, but herein the types and use amounts of various materials of the prepolymer and/or the types and use amounts of various materials of the curing agent were as given in Table 10; various physical properties were then measured. The results are given in Table 10.

TABLE 4

| | | | | Example 1 | Example 2 | Example 3 | Example 4 | Example 5 | Example 6 | Example 7 | Example 8 | Example 9 |
|---|---|---|---|---|---|---|---|---|---|---|---|---|
| Proportion | Prepolymer | MDI amount (g) | | 188.3 | 188.3 | 188.3 | 188.3 | 188.3 | 188.3 | 188.3 | 176.5 | 176.5 |
| | | Polymeric MDI | Type | MR200 | MR200 | MR200 | MR200 | MR200 | MR200 | MR200 | TTI | TTI |
| | | | Amount (g) | 210.0 | 210.0 | 210.0 | 210.0 | 210.0 | 210.0 | 210.0 | 245.0 | 245.0 |
| | | Polyol | Type | PBA2500 | PBA2500 | PBA2500 | PBA2500 | PBA2500 | PBA2500 | PBA2500 | PBA2500 | PBA2500 |
| | | | Amount (g) | 601.7 | 601.7 | 601.7 | 601.7 | 601.7 | 601.7 | 601.7 | 578.5 | 578.5 |

TABLE 4-continued

| | | | Example 1 | Example 2 | Example 3 | Example 4 | Example 5 | Example 6 | Example 7 | Example 8 | Example 9 |
|---|---|---|---|---|---|---|---|---|---|---|---|
| Curing agent | Triol | Type | TMP | TMP | TMP | TMP | TMP | TMP | TMP | TMP | TMP |
| | | Amount (g) | 53.9 | 53.9 | 43.1 | 35.9 | 64.7 | 61.1 | 57.5 | 61.0 | 31.4 |
| | Polyol | Type | PHA1000 | PHA1000 | PHA1000 | PHA1000 | PHA1000 | PHA1000 | PHA1000 | PHA1000 | PHA1000 |
| | | Amount (g) | 305.3 | 305.3 | 244.3 | 203.6 | 366.4 | 346.1 | 325.7 | 321.3 | 211.2 |
| | Polycat46 amount (g) | | 0.16 | 0.16 | 0.13 | 0.11 | 0.19 | 0.18 | 0.17 | 0.16 | 0.11 |
| | No. 25 amount (g) | | 0 | 0 | 0 | 0 | 0 | 0 | 0 | 0 | 0 |
| | RX5 amount (g) | | 1.26 | 0 | 1.01 | 0.84 | 1.51 | 1.42 | 1.34 | 1.26 | 0.84 |
| | RX3 amount (g) | | 0 | 1.32 | 0 | 0 | 0 | 0 | 0 | 0 | 0 |
| Production method | Release agent | | A | A | B | A | B | A | B | A | B |
| | Mold | Production method | I | I | II | II | II | I | I | I | I |
| | | Inclination angle (°) | — | — | 0 | 10 | 25 | — | — | — | — |
| Viscoelasticity | Loss factor (tanδ) | Peak temperature (°C.) | 9.9 | 10.3 | 11.8 | 11.9 | 7.9 | 9.2 | 9.7 | 11.1 | 13.0 |
| | | Maximum value | 0.43 | 0.48 | 0.34 | 0.28 | 0.55 | 0.50 | 0.46 | 0.42 | 0.39 |
| | Loss factor (tanδ) at 55° C. | | 0.16 | 0.14 | 0.21 | 0.21 | 0.13 | 0.14 | 0.15 | 0.30 | 0.32 |
| | M2/M1 | | 0.009 | 0.009 | 0.010 | 0.011 | 0.007 | 0.008 | 0.008 | 0.016 | 0.019 |
| | M3/M1 | | 0.069 | 0.070 | 0.075 | 0.082 | 0.058 | 0.062 | 0.065 | 0.038 | 0.043 |
| Performance evaluation | Vibration | | A | A | A | A | B | B | A | A | A |
| | Followability | | A | A | A | A | B | B | A | A | A |

TABLE 5

| | | | | Example 10 | Example 11 | Example 12 | Example 13 | Example 14 | Comparative Example 1 | Comparative Example 2 |
|---|---|---|---|---|---|---|---|---|---|---|
| Proportion | Prepolymer | MDI | amount (g) | 182.4 | 182.4 | 36.7 | 36.7 | 280.8 | 340.0 | 36.7 |
| | | Polymeric MDI | Type | TPTI | TPTI | MR200 | MR200 | MR200 | — | MR200 |
| | | | Amount (g) | 230.0 | 230.0 | 390.0 | 390.0 | 100.0 | 0 | 390.0 |
| | | Polyol | Type | PBA2500 | PBA2500 | PBA2500 | PBA2500 | PBA2500 | PBA2500 | PBA2500 |
| | | | Amount (g) | 587.6 | 587.6 | 573.3 | 573.3 | 619.2 | 660.0 | 573.3 |
| | Curing agent | Triol | Type | TMP | TMP | TMP | TMP | TMP | TMP | TMP |
| | | | Amount (g) | 58.6 | 52.1 | 43.1 | 35.9 | 31.4 | 18.7 | 64.7 |
| | | Polyol | Type | PHA1000 | PHA1000 | PHA1000 | PHA1000 | PHA1000 | PHA1000 | PHA1000 |
| | | | Amount (g) | 320.4 | 288.4 | 244.3 | 203.6 | 211.2 | 129.4 | 366.4 |
| | Polycat46 amount (g) | | | 0.16 | 0.11 | 0.13 | 0.11 | 0.11 | 0.13 | 0.19 |
| | No. 25 amount (g) | | | 0 | 0 | 0 | 0 | 0 | 0 | 0 |
| | RX5 amount (g) | | | 1.26 | 0.84 | 2.46 | 2.10 | 0.84 | 1.01 | 1.12 |
| | RX3 amount (g) | | | 0 | 0 | 0 | 0.00 | 0 | 0 | 0 |
| Production method | Release agent | | | A | B | A | B | A | B | A |
| | Mold | Production method | | I | I | I | I | I | I | I |
| | | Inclination angle (°) | | — | — | — | — | — | — | — |
| Viscoelasticity | Loss factor (tanδ) | Peak temperature (°C.) | | 10.2 | 12.5 | 13.2 | 13.9 | 10.8 | 2.3 | 10.4 |
| | | Maximum value | | 0.53 | 0.49 | 0.53 | 0.50 | 0.30 | 0.60 | 0.63 |
| | Loss factor (tanδ) at 55° C. | | | 0.24 | 0.25 | 0.46 | 0.46 | 0.17 | 0.05 | 0.40 |
| | M2/M1 | | | 0.015 | 0.018 | 0.026 | 0.029 | 0.005 | 0.000 | 0.013 |
| | M3/M1 | | | 0.042 | 0.049 | 0.025 | 0.028 | 0.108 | 0.096 | 0.018 |
| Performance evaluation | Vibration | | | A | A | A | A | A | C | A |
| | Followability | | | A | A | B | B | A | C | C |

TABLE 6

|  |  |  | Example 15 | Example 16 | Example 17 | Example 18 | Example 19 | Example 20 | Example 21 | Example 22 | Example 23 | Example 24 |
|---|---|---|---|---|---|---|---|---|---|---|---|---|
| Proportion | Prepolymer | MDI amount (g) | 188.3 | 188.3 | 188.3 | 188.3 | 188.3 | 188.3 | 188.3 | 188.3 | 188.3 | 176.5 |
|  |  | Polymeric MDI Type | MR200 | MR200 | MR200 | MR200 | MR200 | MR200 | MR200 | MR200 | MR200 | TTE |
|  |  | Amount (g) | 210 | 210 | 210 | 210.0 | 210.0 | 210.0 | 210.0 | 210.0 | 210.0 | 245.0 |
|  |  | Polyol Type | PBA2500 | PBA2500 | PBA2500 | PBA2500 | PBA2500 | PBA2500 | PBA2500 | PBA2500 | PBA2500 | PBA2500 |
|  |  | Amount (g) | 601.7 | 601.7 | 601.7 | 601.7 | 601.7 | 601.7 | 601.7 | 601.7 | 601.7 | 578.5 |
|  | Curing agent | Triol Type | TMP | TMP | TMP | TMP | TMP | TMP | TMP | TMP | TMP | TMP |
|  |  | Amount (g) | 53.9 | 53.9 | 43.1 | 35.9 | 64.7 | 64.7 | 64.7 | 61.1 | 57.5 | 61.0 |
|  |  | Polyol Type | PHA1000 | PHA1000 | PHA1000 | PHA1000 | PHA1000 | PHA1000 | PHA1000 | PHA1000 | PHA1000 | PHA1000 |
|  |  | Amount (g) | 305.3 | 305.3 | 244.3 | 203.6 | 366.4 | 366.4 | 366.4 | 346.1 | 325.7 | 321.3 |
|  |  | Polycat46 amount (g) | 0.16 | 0.16 | 0.13 | 0.11 | 0.19 | 0.19 | 0.19 | 0.18 | 0.17 | 0.16 |
|  |  | No. 25 amount (g) | 0 | 0 | 0 | 0 | 0 | 0 | 0 | 0 | 0 | 0 |
|  |  | RX5 amount (g) | 1.26 | 0 | 1.01 | 0.84 | 1.51 | 1.51 | 1.51 | 1.42 | 1.34 | 1.26 |
|  |  | RX3 amount (g) | 0 | 1.32 | 0 | 0 | 0 | 0 | 0 | 0 | 0 | 0 |
| Viscoelasticity | Loss factor (tanδ) | Peak temperature (° C.) | 9.9 | 10.3 | 11.8 | 11.9 | 7.9 | 7.9 | 7.9 | 9.2 | 9.7 | 11.1 |
|  |  | Maximum value | 0.43 | 0.48 | 0.34 | 0.28 | 0.55 | 0.55 | 0.55 | 0.50 | 0.46 | 0.42 |
|  | Loss factor (tanδ) at 55° C. |  | 0.16 | 0.14 | 0.21 | 0.21 | 0.13 | 0.13 | 0.13 | 0.14 | 0.15 | 0.30 |
|  | M2/M1 |  | 0.009 | 0.009 | 0.01 | 0.011 | 0.007 | 0.007 | 0.007 | 0.008 | 0.008 | 0.016 |
|  | M3/M1 |  | 0.069 | 0.070 | 0.075 | 0.082 | 0.058 | 0.058 | 0.058 | 0.062 | 0.065 | 0.038 |
| Vehicle wiper member configuration | Lip portion presence or absence |  | Presence | Presence | Presence | Presence | Presence | Presence | Presence | Presence | Presence | Presence |
|  | Shoulder portion presence or absence |  | Presence | Presence | Presence | Presence | Presence | Absence | Absence | Presence | Presence | Presence |
|  | Neck presence or absence |  | Presence | Presence | Presence | Presence | Presence | Presence | Absence | Presence | Presence | Presence |
| Performance evaluation as wiper member for vehicle | Vibration |  | A | A | A | A | B | B | C | B | A | A |
|  | Followability |  | A | A | A | A | B | C | C | B | A | A |

TABLE 7

|  |  |  | Example 25 | Example 26 | Example 27 | Example 28 | Example 29 | Example 30 | Comparative Example 3 | Comparative Example 4 |
|---|---|---|---|---|---|---|---|---|---|---|
| Proportion | Prepolymer | MDI amount (g) | 176.5 | 182.4 | 182.4 | 36.7 | 36.7 | 280.8 | 340.0 | 38.7 |
|  |  | Polymeric MDI Type | TTI | TPTI | TPTI | MR200 | MR200 | MR200 | — | MR200 |
|  |  | Amount (g) | 245.0 | 230.0 | 230.0 | 390.0 | 390.0 | 100.0 | 0.0 | 390.0 |
|  |  | Polyol Type | PBA2500 | PBA2500 | PBA2500 | PBA2500 | PBA2500 | PBA2500 | PBA2500 | PBA2500 |
|  |  | Amount (g) | 578.5 | 587.6 | 587.6 | 573.3 | 573,3 | 619.2 | 660.0 | 573.3 |
|  | Curing agent | Triol Type | TMP | TMP | TMP | TMP | TMP | TMP | TMP | TMP |
|  |  | Amount (g) | 31.4 | 58.6 | 52.1 | 43.1 | 35.9 | 31.4 | 18.7 | 64.7 |
|  |  | Polyol Type | PHA1000 | PHA1000 | PHA1000 | PHA1000 | PHA1000 | PHA1000 | PHA1000 | PHA1000 |
|  |  | Amount (g) | 211.2 | 320.4 | 288.4 | 244.3 | 203.6 | 211.2 | 129.4 | 366.4 |
|  |  | Polycat46 amount (g) | 0.11 | 0.16 | 0.11 | 0.13 | 0.11 | 0.11 | 0.13 | 0.19 |
|  |  | No. 25 amount (g) | 0 | 0 | 0 | 0 | 0 | 0 | 0 | 0 |

TABLE 7-continued

|  |  |  | Example 25 | Example 26 | Example 27 | Example 28 | Example 29 | Example 30 | Comparative Example 3 | Comparative Example 4 |
|---|---|---|---|---|---|---|---|---|---|---|
|  |  | RX5 amount (g) | 0.84 | 1.26 | 0.84 | 2.46 | 2.1 | 0.84 | 1.01 | 1.12 |
|  |  | RX3 amount (g) | 0 | 0 | 0 | 0 | 0 | 0 | 0 | 0 |
| Viscoelasticity | Loss factor (tanδ) | Peak temperature (° C.) | 13 | 10.2 | 12.5 | 13.2 | 13.9 | 10.8 | 2.3 | 10.4 |
|  |  | Maximum value | 0.39 | 0.53 | 0.49 | 0.53 | 0.50 | 0.30 | 0.60 | 0.63 |
|  | Loss factor (tanδ) at 55° C. |  | 0.32 | 0.24 | 0.25 | 0.46 | 0.46 | 0.17 | 0.05 | 0.40 |
|  | M2/M1 |  | 0.019 | 0.015 | 0.018 | 0.026 | 0.029 | 0.005 | 0.000 | 0.013 |
|  | M3/M1 |  | 0.043 | 0.042 | 0.049 | 0.025 | 0.028 | 0.108 | 0.096 | 0.018 |
| Vehicle wiper member configuration | Lip portion presence or absence |  | Presence | Presence | Presence | Presence | Presence | Presence | Presence | Presence |
|  | Shoulder portion presence or absence |  | Presence | Presence | Presence | Presence | Presence | Presence | Presence | Presence |
|  | Neck presence or absence |  | Presence | Presence | Presence | Presence | Presence | Presence | Presence | Presence |
| Performance evaluation as wiper member for vehicle | Vibration |  | A | A | A | A | A | A | D | B |
|  | Followability |  | A | A | A | B | B | A | D | D |

TABLE 8

|  |  |  |  | Example 31 | Example 32 | Example 33 | Example 34 | Example 35 | Example 36 | Example 37 | Example 38 | Example 39 |
|---|---|---|---|---|---|---|---|---|---|---|---|---|
| Proportion | Prepolymer | MDI | amount (g) | 188.3 | 188.3 | 188.3 | 188.3 | 188.3 | 188.3 | 188.3 | 176.5 | 176.5 |
|  |  | Polymeric MDI | Type | MR200 | MR200 | MR200 | MR200 | MR200 | MR200 | MR200 | TTI | TTI |
|  |  |  | Amount (g) | 210 | 210 | 210.0 | 210.0 | 210.0 | 210.0 | 210.0 | 245.0 | 245.0 |
|  |  | Polyol | Type | PBA2500 | PBA2500 | PBA2500 | PBA2500 | PBA2500 | PBA2500 | PBA2500 | PBA2500 | PBA2500 |
|  |  |  | Amount (g) | 601.7 | 601.7 | 601.7 | 601.7 | 601.7 | 601.7 | 601.7 | 578.5 | 578.5 |
|  | Curing agent | Triol | Type | TMP | TMP | TMP | TMP | TMP | TMP | TMP | TMP | TMP |
|  |  |  | Amount (g) | 53.9 | 53.9 | 43.1 | 35.9 | 64.7 | 61.1 | 57.5 | 61.0 | 31.4 |
|  |  | Polyol | Type | PHA1000 | PHA1000 | PHA1000 | PHA1000 | PHA1000 | PHA1000 | PHA1000 | PHA1000 | PHA1000 |
|  |  |  | Amount (g) | 305.3 | 305.3 | 244.3 | 203.6 | 366.4 | 346.1 | 325.7 | 321.3 | 211.2 |
|  |  | Polycat46 amount (g) |  | 0.16 | 0.16 | 0.13 | 0.11 | 0.19 | 0.18 | 0.17 | 0.16 | 0.11 |
|  |  | No. 25 amount (g) |  | 0 | 0 | 0 | 0 | 0 | 0 | 0 | 0 | 0 |
|  |  | RX5 amount (g) |  | 1.26 | 0 | 1.01 | 0.84 | 1.51 | 1.42 | 1.34 | 1.26 | 0.84 |
|  |  | RX3 amount (g) |  | 0 | 1.32 | 0 | 0 | 0 | 0 | 0 | 0 | 0 |
| Viscoelasticity | Loss factor (tanδ) | Peak temperature (° C.) |  | 9.9 | 10.3 | 11.8 | 11.9 | 7.9 | 9.2 | 9.7 | 11.1 | 13 |
|  |  | Maximum value |  | 0.43 | 0.48 | 0.3 | 0.28 | 0.55 | 0.50 | 0.46 | 0.42 | 0.39 |
|  | Loss factor (tanδ) at 55° C. |  |  | 0.16 | 0.14 | 0.21 | 0.21 | 0.13 | 0.14 | 0.15 | 0.30 | 0.32 |
|  | M2/M1 |  |  | 0.009 | 0.009 | 0.010 | 0.011 | 0.007 | 0.008 | 0.008 | 0.016 | 0.019 |
|  | M3/M1 |  |  | 0.069 | 0.070 | 0.075 | 0.082 | 0.058 | 0.062 | 0.065 | 0.038 | 0.043 |
| Performance evaluation as a surface wiping member | W direction | Vibration |  | A | A | A | A | A | A | A | A | A |
|  |  | Followability |  | A | A | A | A | A | A | A | A | A |
|  | C direction | Vibration |  | A | A | A | A | B | B | A | A | A |
|  |  | Followability |  | A | A | A | A | B | B | A | A | A |

TABLE 9

| | | | | Example 40 | Example 41 | Example 42 | Example 43 | Example 44 | Comparative Example 5 | Comparative Example 6 |
|---|---|---|---|---|---|---|---|---|---|---|
| Proportion | Prepolymer | MDI | amount (g) | 182.4 | 182.4 | 36.7 | 36.7 | 280.8 | 340.0 | 36.7 |
| | | Polymeric MDI | Type | TPTI | TPTI | MR200 | MR200 | MR200 | — | MR200 |
| | | | Amount (g) | 230.0 | 230.0 | 390.0 | 390.0 | 100.0 | 0.0 | 390.0 |
| | | Polyol | Type | PBA2500 | PBA2500 | PBA2500 | PBA2500 | PBA2500 | PBA2500 | PBA2500 |
| | | | Amount (g) | 587.6 | 587.6 | 573.3 | 573.3 | 619.2 | 660.0 | 573.3 |
| | Curing agent | Triol | Type | TMP | TMP | TMP | TMP | TMP | TMF | TMP |
| | | | Amount (g) | 58.6 | 52.1 | 43.1 | 35.9 | 31.4 | 18.7 | 64.7 |
| | | Polyol | Type | PHA1000 | PHA1000 | PHA1000 | PHA1000 | PHA1000 | PHA1000 | PHA1000 |
| | | | Amount (g) | 320.4 | 288.4 | 244.3 | 203.6 | 211.2 | 129.4 | 366.4 |
| | | Polycat46 amount (g) | | 0.16 | 0.11 | 0.13 | 0.11 | 0.11 | 0.13 | 0.19 |
| | | No. 25 amount (g) | | 0 | 0 | 0 | 0 | 0 | 0 | 0 |
| | | RX5 amount (g) | | 1.26 | 0.84 | 2.46 | 2.1 | 0.84 | 1.01 | 1.12 |
| | | RX3 amount (g) | | 0 | 0 | 0 | 0 | 0 | 0 | 0 |
| Viscoelasticity | Loss factor (tanδ) | Peak temperature (° C.) | | 10.2 | 12.5 | 13.2 | 13.9 | 10.8 | 2.3 | 10.4 |
| | | Maximum value | | 0.53 | 0.49 | 0.53 | 0.50 | 0.30 | 0.60 | 0.63 |
| | Loss factor (tanδ) at 55° C. | | | 0.24 | 0.25 | 0.46 | 0.46 | 0.17 | 0.05 | 0.40 |
| | M2/M1 | | | 0.015 | 0.018 | 0.026 | 0.029 | 0.005 | 0.000 | 0.013 |
| | M3/M1 | | | 0.042 | 0.049 | 0.025 | 0.028 | 0.108 | 0.096 | 0.018 |
| Performance evaluation as a surface wiping member | W direction | Vibration | | A | A | A | A | A | C | A |
| | | Followability | | A | A | A | A | A | C | C |
| | C direction | Vibration | | A | A | A | A | A | C | A |
| | | Followability | | A | A | B | B | A | C | C |

TABLE 10

| | | | | Reference Example 1 | Reference Example 2 |
|---|---|---|---|---|---|
| Proportion | Prepolymer | MDI | amount (g) | 199.6 | 340.0 |
| | | Polymeric MDI | | MR200 188.0 | — 0.0 |
| | | Polyol | | PBA2500 612.4 | PBA2500 660.0 |
| | Curing agent | Triol | | TMP 53.9 | TMP 18.7 |
| | | Polyol | | PHA1000 305.3 | PHA1000 129.4 |
| | | Polycat46 amount (g) | | 0.16 | 0.13 |
| | | No. 25 amount (g) | | 0.52 | 0.55 |
| | | RX5 amount (g) | | 0 | 0 |
| | | RX3 amount (g) | | 0 | 0 |
| Viscoelasticity | Loss factor (tanδ) | | | 8.5 0.51 | −0.6 0.72 |
| | Loss factor (tanδ) at 55° C. | | | 0.09 | 0.04 |
| | M2/M1 | | | 0.009 | 0.000 |
| | M3/M1 | | | 0.072 | 0.095 |

One aspect of the present disclosure succeeds in providing a cleaning member that allows preventing impairment of wiping performance, when heated up by being used in high-temperature environments or by being used over long periods of time. Another aspect of the present disclosure succeeds in providing an elastic member having a loss factor tan δ that does not drop readily even under high temperatures.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A cleaning member comprising an elastic member comprising a polyurethane, and the cleaning member cleans a surface of a to-be-cleaned member through contact of at least a part of the elastic member against the surface of the to-be-cleaned member,
wherein in measurement with a temperature range of −20° C. to +60° C. of a loss factor tan δ of a sample sampled from the elastic member so as to include a portion of contact with the to-be-cleaned member,
a peak temperature of a peak denoting a maximum value of tan δ is present at 15.0° C. or below, and a maximum value of tan δ is from 0.20 to 0.55, and
tan δ at a temperature of 55° C. is 0.13 or larger, and
wherein, when the sample sampled from the elastic member so as to include the portion of contact with the to-be-cleaned member is heated and vaporized within an ionization chamber and heated up to 1000° C. at a ramp rate of 10° C./second by using a mass spectrometer of direct sample introduction type which ionizes molecules constituting the sample, with M1 denoting a detected amount of all ions obtained, and M2 denoting a peak integrated intensity in an extracted ion thermogram corresponding to a range of an m/z value derived from a polyfunctional isocyanate having three or more isocyanate groups,
M2/M1 is 0.001 or higher.

2. The cleaning member according to claim 1, wherein M2/M1 is from 0.001 to 0.035.

3. The cleaning member according to claim 1, wherein the polyurethane comprises
a reaction product of a composition comprising
an isocyanate compound including a diisocyanate and a polyfunctional isocyanate having three or more isocyanate groups; and
an alcohol including a trifunctional or higher polyfunctional alcohol.

4. The cleaning member according to claim 3, wherein, when the sample is heated and vaporized within an ionization chamber, and heated up to 1000° C. at a ramp rate of 10° C./second by using a mass spectrometer of direct sample introduction type which ionizes the molecules constituting the sample, with M3 denoting a peak integrated intensity in an extracted ion thermogram corresponding to a range of an m/z value derived from the diisocyanate, M3/M1 is 0.025 to 0.130.

5. The cleaning member according to claim 3, wherein the polyfunctional isocyanate is at least one selected from the group consisting of polymeric MDI, triphenylmethane-4,4', 4''-triisocyanate and tris(phenylisocyanate)thiophosphate.

6. The cleaning member according to claim 3, wherein the diisocyanate is at least one selected from the group consisting of 4,4'-diphenylmethane diisocyanate, 2,4-tolylene diisocyanate, 2,6-tolylene diisocyanate, xylene diisocyanate, 1,5-naphthylene isocyanate, p-phenylene diisocyanate, hexamethylene diisocyanate, isophorone diisocyanate, 4,4'-dicyclohexylmethane diisocyanate, tetramethylxylene diisocyanate and carbodiimide-modified diphenylmethane diisocyanate.

7. The cleaning member according to claim 1, wherein the cleaning member is an electrophotographic cleaning blade.

8. The cleaning member according to claim 7, further comprising a support member that supports the elastic member.

9. The cleaning member according to claim 1, wherein the cleaning member is a wiper member for a wiper device for a vehicle windshield.

10. The cleaning member according to claim 9, wherein the wiper member comprises at least a vehicle wiper support portion and a lip portion for contact with a surface of the windshield.

11. The cleaning member according to claim 9, wherein the wiper member has at least a vehicle wiper support portion and a lip portion for contact with a surface of the windshield, and a shoulder portion on a side of the vehicle wiper support portion of the lip portion.

12. The cleaning member according to claim 9, wherein the wiper member has at least a vehicle wiper support portion, and a lip portion that is swingably connected to the vehicle wiper support portion via a neck.

13. The cleaning member according to claim 1, wherein the cleaning member is a cleaning member for wiping, which cleans the surface of the to-be-cleaned member through contact of the elastic member against the surface of the to-be-cleaned member.

14. The cleaning member according to claim 13, wherein the cleaning member has the elastic member contacting the surface of the to-be-cleaned member, and an elastic member support portion that supports the elastic member over a longitudinal direction of the elastic member.

15. An elastic member comprising a polyurethane, wherein
when a loss factor tan δ of a sample sampled from the elastic member is measured in a temperature range of −20° C. to +60° C.,
a peak temperature of a peak denoting a maximum value of tan δ is present at 15.0° C. or below, and a maximum value of tan δ is from 0.20 to 0.55, and
tan δ at a temperature of 55° C. is 0.13 or larger, wherein,
when the sample sampled from the elastic member is heated and vaporized within an ionization chamber and heated up to 1000° C. at a ramp rate of 10° C./second by using a mass spectrometer of direct sample introduction type which ionizes molecules constituting the sample, and with M1 denoting a detected amount of all ions obtained, and M2 denoting a peak integrated intensity in an extracted ion thermogram corresponding to a range of an m/z value derived from a polyfunctional isocyanate having three or more isocyanate groups,
M2/M1 is 0.001 or higher.

16. The elastic member according to claim 15, wherein M2/M1 is from 0.001 to 0.035.

17. The elastic member according to claim 15, wherein the polyurethane comprises
a reaction product of a composition comprising
an isocyanate compound including a diisocyanate and a polyfunctional isocyanate having three or more isocyanate groups; and
an alcohol including a trifunctional or higher polyfunctional alcohol.

18. The elastic member according to claim 17, wherein, when the sample is heated and vaporized within an ionization chamber, and heated up to 1000° C. at a ramp rate of 10° C./second by using a mass spectrometer of direct sample introduction type which ionizes the molecules constituting the sample, with M3 denoting a peak integrated intensity in an extracted ion thermogram corresponding to a range of an m/z value derived from the diisocyanate, M3/M1 is 0.025 to 0.130.

* * * * *